US012634753B2

(12) United States Patent (10) Patent No.: US 12,634,753 B2
Abotabl et al. (45) Date of Patent: May 19, 2026

(54) TRANSPORT BLOCK SIZE DETERMINATION IN SUBBAND FULL DUPLEX SLOTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 370 days.

(21) Appl. No.: 18/181,689

(22) Filed: Mar. 10, 2023

(65) Prior Publication Data

US 2024/0306036 A1    Sep. 12, 2024

(51) Int. Cl.
H04W 28/06 (2009.01)
H04L 5/14 (2006.01)
H04W 72/12 (2023.01)
H04W 72/20 (2023.01)

(52) U.S. Cl.
CPC .............. H04W 28/06 (2013.01); H04L 5/14 (2013.01); H04W 72/12 (2013.01); H04W 72/20 (2023.01)

(58) Field of Classification Search
CPC ..... H04W 72/12; H04W 72/20; H04W 28/06; H04L 5/14
See application file for complete search history.

(56) References Cited

U.S. PATENT DOCUMENTS

| | | | | |
|---|---|---|---|---|
| 2017/0142702 A1* | 5/2017 | Yu | .......................... | H04W 72/20 |
| 2022/0131582 A1* | 4/2022 | Park | .................... | H04W 72/044 |
| 2022/0231808 A1* | 7/2022 | Oh | ......................... | H04L 5/0048 |
| 2022/0393847 A1* | 12/2022 | Moon | ...................... | H04L 5/14 |
| 2023/0007641 A1* | 1/2023 | Kim | ..................... | H04W 72/044 |
| 2023/0163937 A1* | 5/2023 | Awadin | ................... | H04L 5/001 |
| | | | | 370/329 |
| 2023/0164674 A1* | 5/2023 | Zhou | .................... | H04W 36/362 |
| | | | | 370/252 |
| 2023/0254829 A1* | 8/2023 | Xiong | ................... | H04L 1/1861 |
| | | | | 370/329 |
| 2024/0064717 A1* | 2/2024 | Yoshimura | .............. | H04W 8/24 |
| 2024/0064720 A1* | 2/2024 | Abdelghaffar | .... | H04W 72/0453 |
| 2024/0214852 A1* | 6/2024 | Kiran | .................... | H04W 24/10 |
| 2024/0284208 A1* | 8/2024 | Mahama | .............. | H04L 5/0051 |

* cited by examiner

*Primary Examiner* — Syed Ali

(74) *Attorney, Agent, or Firm* — Holland & Hart LLP

(57) ABSTRACT

Methods, systems, and devices for wireless communications are described. A user equipment (UE) and/or a network entity may apply rate matching for a scheduled data transmission in a subband full duplex (SBFD) time resource or may adjust the transport block size (TBS) for the scheduled data transmission when some of the allocated resource blocks (RBs) for a data transmission are unavailable because they are in a guard band or in a subband in the opposite direction of the scheduled data transmission (e.g., an uplink subband for a downlink data transmission or a downlink subband for an uplink data transmission). In some examples, the network may indicate to the UE whether to rate match or adjust the TBS for a transmission in an SBFD time resource.

22 Claims, 19 Drawing Sheets

205-a 205-b

200

1210    1220    1215

1205

1200

130 105 115

Network
Entity

Transceiver 1510

Antenna 1515

Communications
Manager

1520

Memory

Code

1530

1525

1540

Processor

1535

1505

1500

Figure 16:
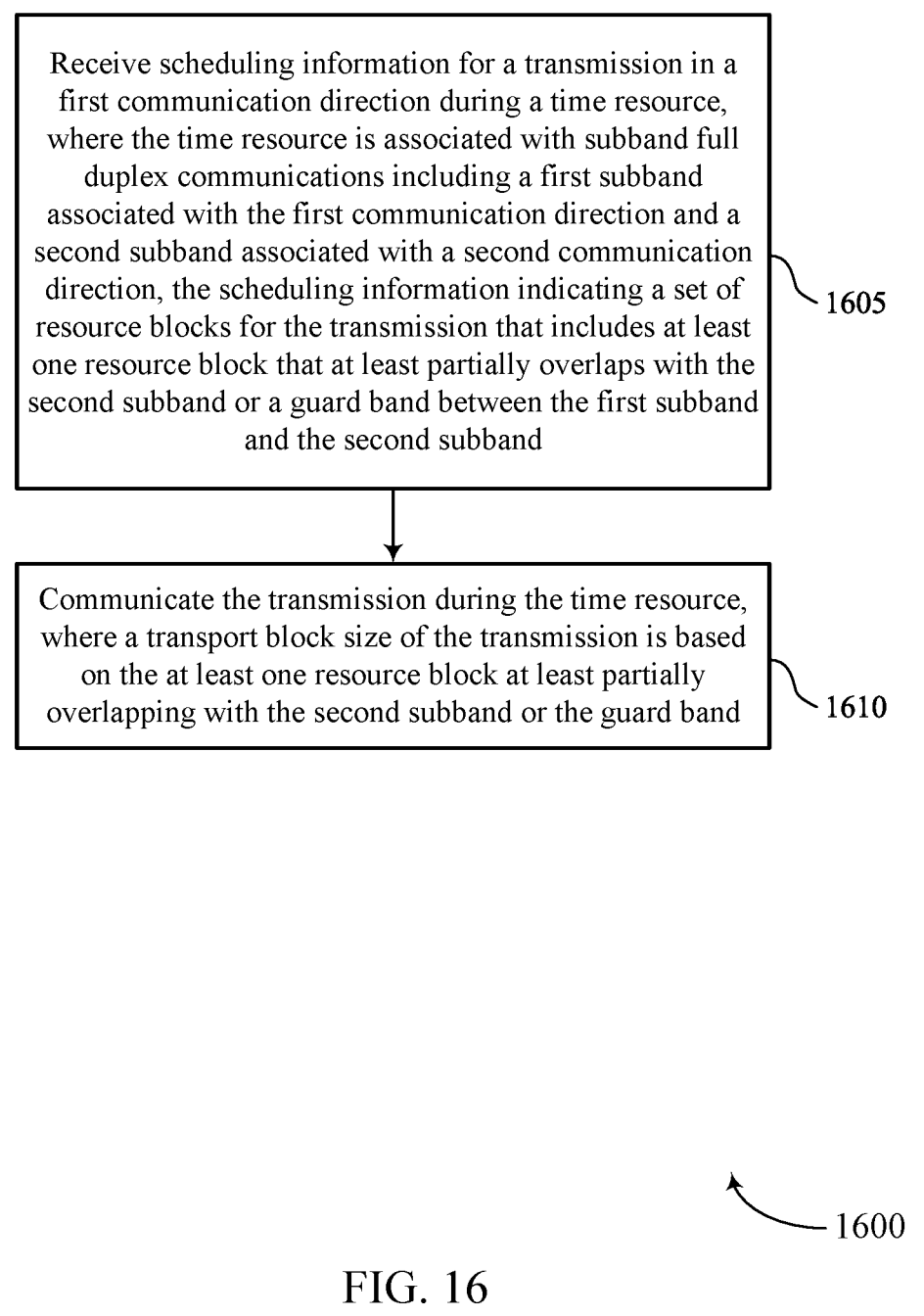

Receive scheduling information for a transmission in a first communication direction during a time resource, where the time resource is associated with subband full duplex communications including a first subband associated with the first communication direction and a second subband associated with a second communication direction, the scheduling information indicating a set of resource blocks for the transmission that includes at least one resource block that at least partially overlaps with the second subband or a guard band between the first subband and the second subband

1605

Communicate the transmission during the time resource, where a transport block size of the transmission is based on the at least one resource block at least partially overlapping with the second subband or the guard band

Figure 17:
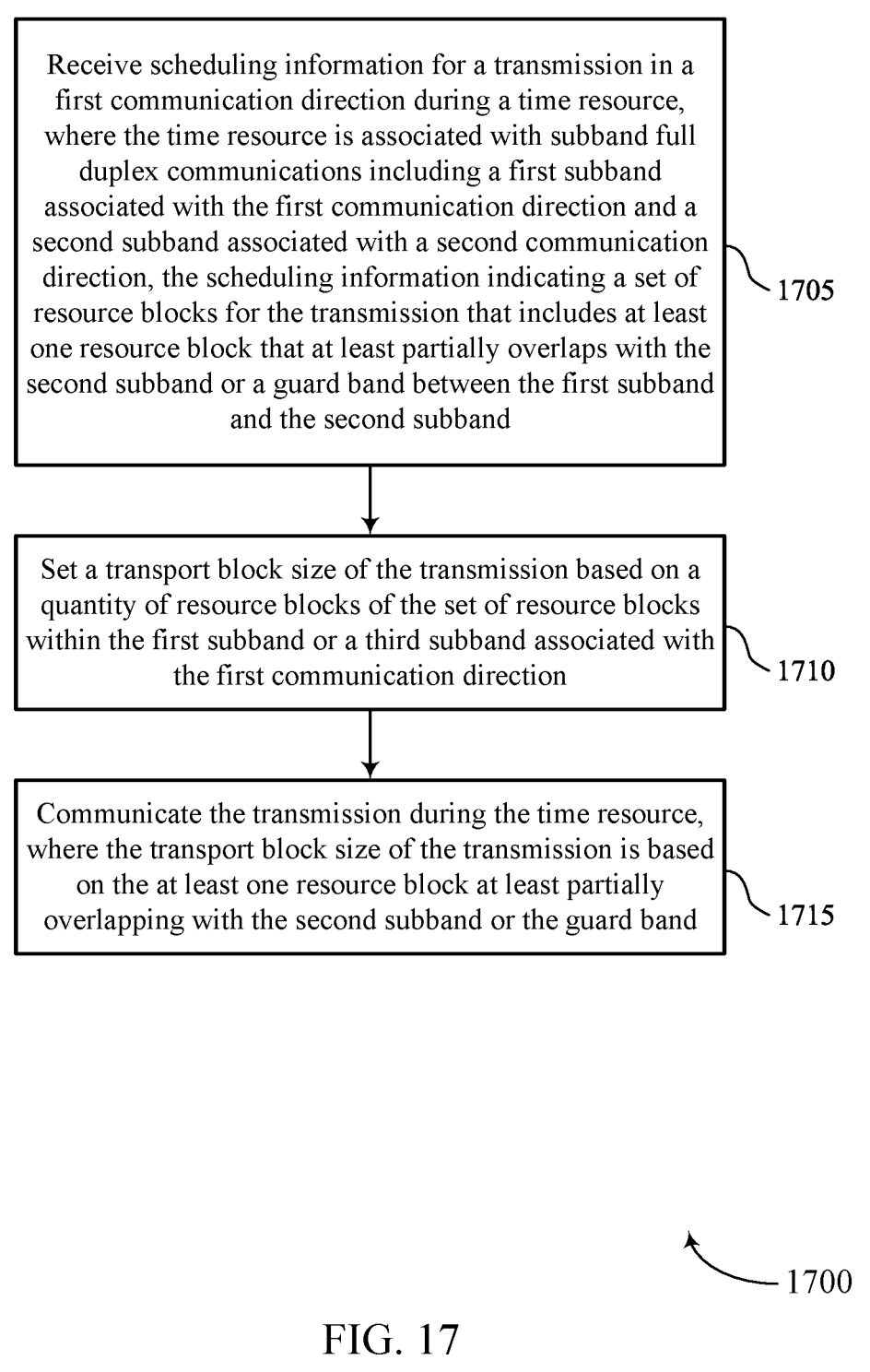

Receive scheduling information for a transmission in a first communication direction during a time resource, where the time resource is associated with subband full duplex communications including a first subband associated with the first communication direction and a second subband associated with a second communication direction, the scheduling information indicating a set of resource blocks for the transmission that includes at least one resource block that at least partially overlaps with the second subband or a guard band between the first subband and the second subband ⟩ 1705

Set a transport block size of the transmission based on a quantity of resource blocks of the set of resource blocks within the first subband or a third subband associated with the first communication direction ⟩ 1710

Communicate the transmission during the time resource, where the transport block size of the transmission is based on the at least one resource block at least partially overlapping with the second subband or the guard band ⟩ 1715

Figure 18:
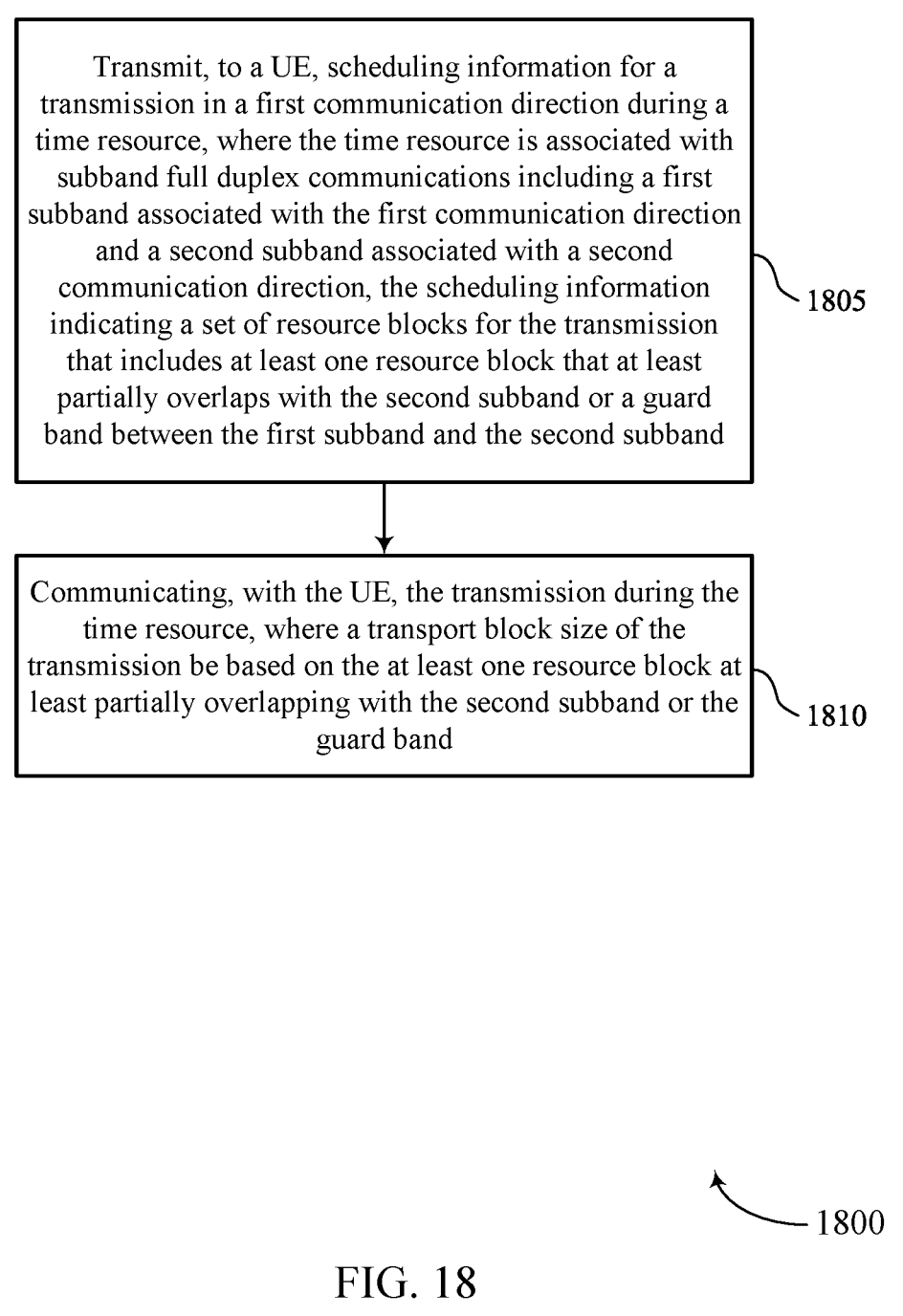

Transmit, to a UE, scheduling information for a transmission in a first communication direction during a time resource, where the time resource is associated with subband full duplex communications including a first subband associated with the first communication direction and a second subband associated with a second communication direction, the scheduling information indicating a set of resource blocks for the transmission that includes at least one resource block that at least partially overlaps with the second subband or a guard band between the first subband and the second subband

1805

Communicating, with the UE, the transmission during the time resource, where a transport block size of the transmission be based on the at least one resource block at least partially overlapping with the second subband or the guard band

Figure 19:
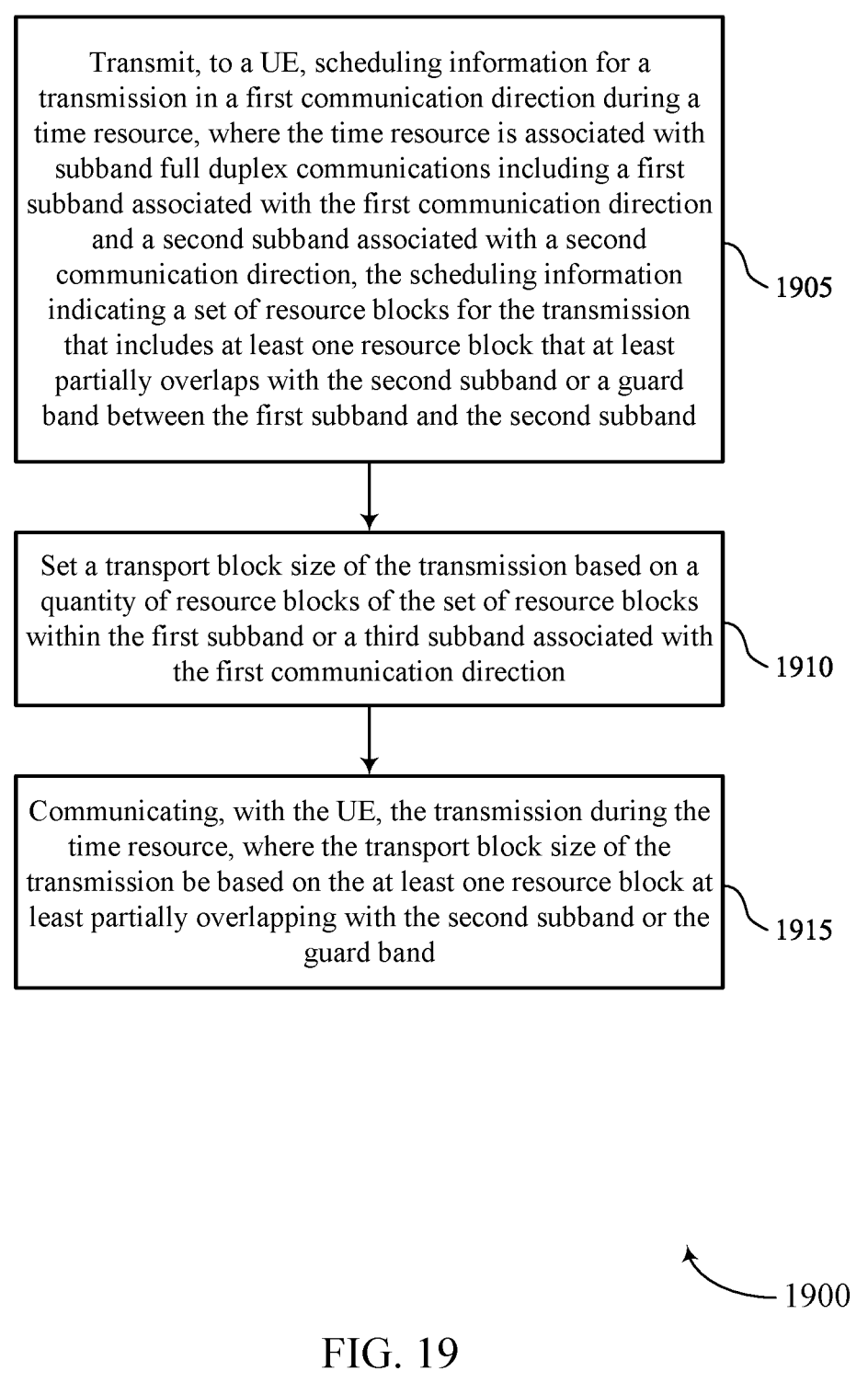

Transmit, to a UE, scheduling information for a transmission in a first communication direction during a time resource, where the time resource is associated with subband full duplex communications including a first subband associated with the first communication direction and a second subband associated with a second communication direction, the scheduling information indicating a set of resource blocks for the transmission that includes at least one resource block that at least partially overlaps with the second subband or a guard band between the first subband and the second subband

1905

Set a transport block size of the transmission based on a quantity of resource blocks of the set of resource blocks within the first subband or a third subband associated with the first communication direction

1910

Communicating, with the UE, the transmission during the time resource, where the transport block size of the transmission be based on the at least one resource block at least partially overlapping with the second subband or the guard band

TRANSPORT BLOCK SIZE DETERMINATION IN SUBBAND FULL DUPLEX SLOTS

FIELD OF TECHNOLOGY

The following relates to wireless communications, including transport block size determination in subband full duplex slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support transport block size (TBS) determination in subband full duplex (SBFD) slots. For example, the described techniques provide for applying rate matching for a scheduled data transmission in an SBFD time resource or adjusting the TBS for the scheduled data transmission when some of the allocated resource blocks (RBs) for a data transmission are unavailable because they are in a guard band or in a subband in the opposite direction of the scheduled data transmission (e.g., an uplink subband for a downlink data transmission or a downlink subband for an uplink data transmission). TBS adjustment may be used instead of rate matching, for example, in scenarios where the band is large or a large quantity of allocated RBs are in the guard band or in the subband in the opposite direction of the scheduled data transmission. In some examples, the network may indicate to the UE whether to rate match or adjust the TBS for a scheduled data transmission in an SBFD time resource where the allocated RBs for the scheduled data transmission includes one or more RBs in the guard band or in the subband in the opposite direction of the data transmission. In some examples, the network may indicate a threshold percentage of allocated RBs or a threshold quantity of allocated RBs at which point to adjust the TBS instead of rate matching.

A method for wireless communications at a UE is described. The method may include receiving scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband and communicating the transmission during the time resource, where a TBS of the transmission is based on the at least one RB at least partially overlapping with the second subband or the guard band.

An apparatus for wireless communications at a UE is described. The apparatus may include a processor, memory coupled with the processor, and instructions stored in the memory. The instructions may be executable by the processor to cause the apparatus to receive scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband and communicate the transmission during the time resource, where a TBS of the transmission is based on the at least one RB at least partially overlapping with the second subband or the guard band.

Another apparatus for wireless communications at a UE is described. The apparatus may include means for receiving scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband and means for communicating the transmission during the time resource, where a TBS of the transmission is based on the at least one RB at least partially overlapping with the second subband or the guard band.

A non-transitory computer-readable medium storing code for wireless communications at a UE is described. The code may include instructions executable by a processor to receive scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband and communicate the transmission during the time resource, where a TBS of the transmission is based on the at least one RB at least partially overlapping with the second subband or the guard band.

In some examples of the method, apparatuses, and non-transitory computer-readable medium described herein, communicating the transmission during the time resource may include operations, features, means, or instructions for setting the TBS of the transmission based on a quantity of RBs of the set of RBs within the first subband or a third subband associated with the first communication direction.

Some examples of the method, apparatuses, and non-transitory computer-readable medium described herein may further include operations, features, means, or instructions for receiving control signaling indicating to set the TBS of transmissions in the first communication direction that may be scheduled with at least one RB that at least partially overlaps with the second subband or the guard band based on respective quantities of RBs scheduled for the transmissions that may be associated with the first communication direction.

Some examples of the method, apparatuses, and non-transitory computer-readable medium described herein may further include operations, features, means, or instructions for receiving control signaling indicating to set the TBS of transmissions in the first communication direction that may be scheduled with a threshold quantity of RBs that at least partially overlaps with the second subband or the guard band based on respective quantities of RBs scheduled for the transmissions that may be associated with the first communication direction, where a second quantity of RBs of the set of RBs that at least partially overlap with the second subband or the guard band satisfy the threshold quantity.

In some examples of the method, apparatuses, and non-transitory computer-readable medium described herein, communicating the transmission during the time resource may include operations, features, means, or instructions for setting the TBS of the transmission based on a total quantity of RBs of the set of RBs and rate matching data of the transmission based on a second quantity of RBs of the set of RBs that at least partially overlap with the second subband or the guard band.

Some examples of the method, apparatuses, and non-transitory computer-readable medium described herein may further include operations, features, means, or instructions for receiving control signaling indicating to rate match data of transmissions in the first communication direction that may be scheduled with at least one RB that at least partially overlaps with the second subband or the guard band.

In some examples of the method, apparatuses, and non-transitory computer-readable medium described herein, receiving the scheduling information may include operations, features, means, or instructions for receiving a bitmap indicating the set of RBs, where each bit of the bitmap corresponds to a RB that at least partially overlaps with the second subband or the guard band indicates whether to rate match the transmission for that RB or to set the TBS for the transmission based on that RB at least partially overlapping with the second subband or the guard band.

Some examples of the method, apparatuses, and non-transitory computer-readable medium described herein may further include operations, features, means, or instructions for receiving control signaling indicating the time resource may be associated with SBFD communications.

In some examples of the method, apparatuses, and non-transitory computer-readable medium described herein, the SBFD communications includes a third subband associated with the first communication direction, the set of RBs includes a first subset of RBs in the first subband, a second subset of RBs in the second subband, and a third subset of RBs in the third subband, and communicating the transmission includes communicating the transmission via the first subset of RBs and the third subset of RBs.

In some examples of the method, apparatuses, and non-transitory computer-readable medium described herein, communicating the transmission may include operations, features, means, or instructions for transmitting via an uplink shared channel, where the first communication direction may be an uplink direction and the second communication direction may be a downlink direction.

In some examples of the method, apparatuses, and non-transitory computer-readable medium described herein, communicating the transmission may include operations, features, means, or instructions for receiving via a downlink shared channel, where the first communication direction may be a downlink direction and the second communication direction may be an uplink direction.

A method for wireless communications at a network entity is described. The method may include transmitting, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband and communicating, with the UE, the transmission during the time resource, where a TBS of the transmission is based on the at least one RB at least partially overlapping with the second subband or the guard band.

An apparatus for wireless communications at a network entity is described. The apparatus may include a processor, memory coupled with the processor, and instructions stored in the memory. The instructions may be executable by the processor to cause the apparatus to transmit, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband and communicating, with the UE, the transmission during the time resource, where a TBS of the transmission be based on the at least one RB at least partially overlapping with the second subband or the guard band.

Another apparatus for wireless communications at a network entity is described. The apparatus may include means for transmitting, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband and means for communicating, with the UE, the transmission during the time resource, where a TBS of the transmission is based on the at least one RB at least partially overlapping with the second subband or the guard band.

A non-transitory computer-readable medium storing code for wireless communications at a network entity is described. The code may include instructions executable by a processor to transmit, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband and communicating, with the UE, the transmission during the time resource, where a TBS of the transmission be based on the at least one RB at least partially overlapping with the second subband or the guard band.

In some examples of the method, apparatuses, and non-transitory computer-readable medium described herein, communicating the transmission during the time resource may include operations, features, means, or instructions for setting the TBS of the transmission based on a quantity of RBs of the set of RBs within the first subband or a third subband associated with the first communication direction.

Some examples of the method, apparatuses, and non-transitory computer-readable medium described herein may further include operations, features, means, or instructions for transmitting control signaling indicating to set the TBS of transmissions in the first communication direction that may be scheduled with at least one RB that at least partially overlaps with the second subband or the guard band based on respective quantities of RBs scheduled for the transmissions that may be associated with the first communication direction.

Some examples of the method, apparatuses, and non-transitory computer-readable medium described herein may further include operations, features, means, or instructions for transmitting control signaling indicating to set the TBS of transmissions in the first communication direction that may be scheduled with a threshold quantity of RBs that at least partially overlaps with the second subband or the guard band based on respective quantities of RBs scheduled for the transmissions that may be associated with the first communication direction, where a second quantity of RBs of the set of RBs that at least partially overlap with the second subband or the guard band satisfy the threshold quantity.

In some examples of the method, apparatuses, and non-transitory computer-readable medium described herein, communicating the transmission during the time resource may include operations, features, means, or instructions for setting the TBS of the transmission based on a total quantity of RBs of the set of RBs and rate matching data of the transmission based on a second quantity of RBs of the set of RBs that at least partially overlap with the second subband or the guard band.

Some examples of the method, apparatuses, and non-transitory computer-readable medium described herein may further include operations, features, means, or instructions for transmitting control signaling indicating to rate match data of transmissions in the first communication direction that may be scheduled with at least one RB that at least partially overlaps with the second subband or the guard band.

In some examples of the method, apparatuses, and non-transitory computer-readable medium described herein, transmitting the scheduling information may include operations, features, means, or instructions for transmitting a bitmap indicating the set of RBs, where each bit of the bitmap corresponds to a RB that at least partially overlaps with the second subband or the guard band indicates whether to rate match the transmission for that RB or to set the TBS for the transmission based on that RB at least partially overlapping with the second subband or the guard band.

Some examples of the method, apparatuses, and non-transitory computer-readable medium described herein may further include operations, features, means, or instructions for transmitting control signaling indicating the time resource may be associated with SBFD communications.

In some examples of the method, apparatuses, and non-transitory computer-readable medium described herein, the SBFD communications includes a third subband associated with the first communication direction, the set of RBs includes a first subset of RBs in the first subband, a second subset of RBs in the second subband, and a third subset of RBs in the third subband, and communicating the transmission includes communicating the transmission via the first subset of RBs and the third subset of RBs.

In some examples of the method, apparatuses, and non-transitory computer-readable medium described herein, communicating the transmission may include operations, features, means, or instructions for receiving via an uplink shared channel, where the first communication direction may be an uplink direction and the second communication direction may be a downlink direction.

In some examples of the method, apparatuses, and non-transitory computer-readable medium described herein, communicating the transmission may include operations, features, means, or instructions for receiving via a downlink shared channel, where the first communication direction may be a downlink direction and the second communication direction may be an uplink direction.

BRIEF DESCRIPTION OF THE DRAWINGS

FIGS. 16 through 19 illustrate flowcharts showing methods that support TBS determination in SBFD slots in accordance with one or more aspects of the present disclosure.

DETAILED DESCRIPTION

Figure 1:
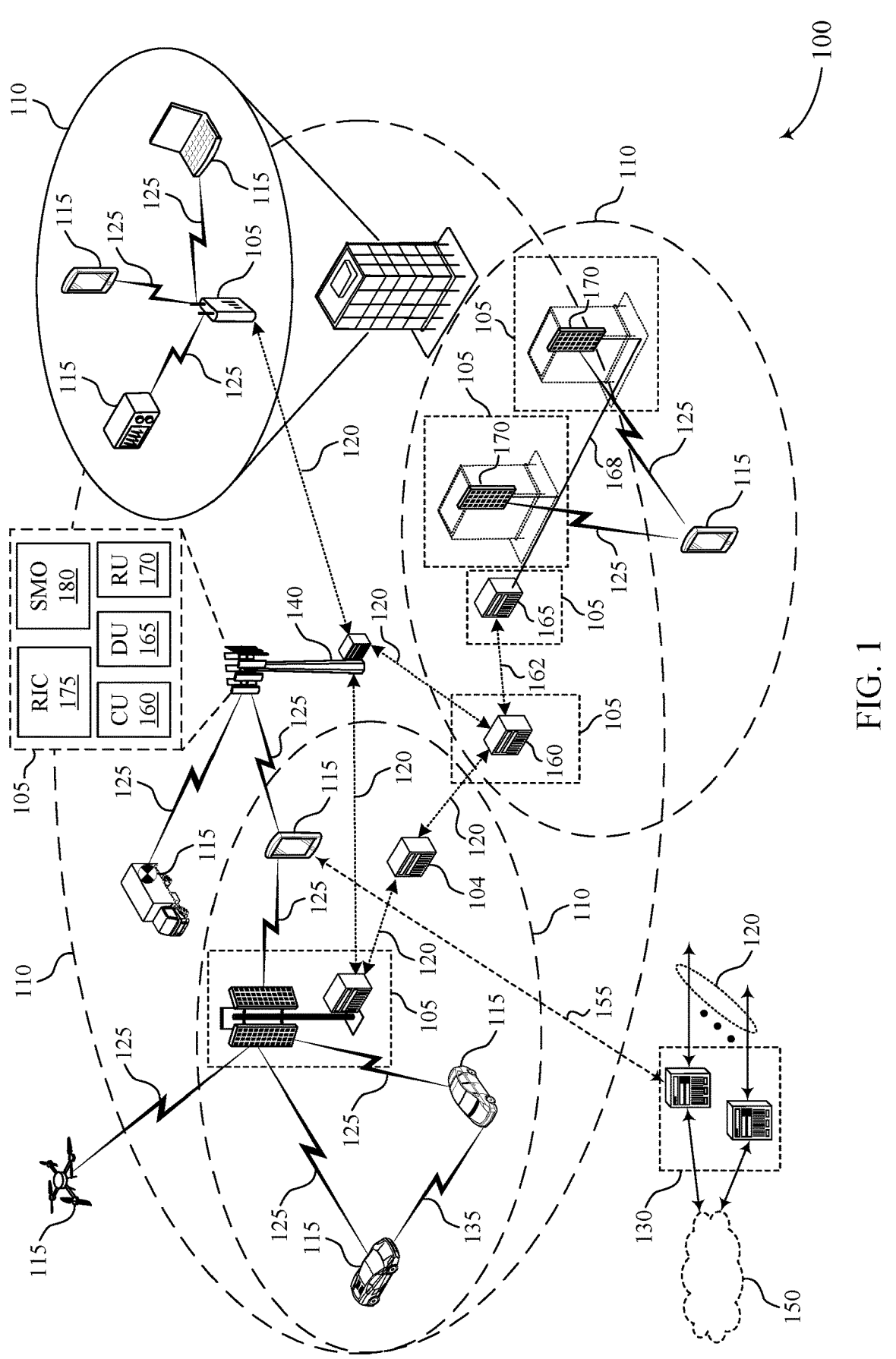
FIG. 1 illustrates an example of a wireless communications system that supports transport block size (TBS) determination in SBFD (SBFD) slots in accordance with one or more aspects of the present disclosure.

Some wireless communications systems may implement a subband full duplex (SBFD) communication scheme, where a first set of frequency resources (which may include one or more non-contiguous subbands) may be used for communications in one direction (one or uplink or downlink), and a second set of frequency resources (which may include one or more non-contiguous subbands) may be used for communications in the other direction in a same time resource (e.g., the same slot or symbol). A user equipment (UE) may receive scheduling information (e.g., via a downlink control information (DCI)) for a data transmission (e.g., a physical downlink shared channel (PDSCH) or a physical uplink shared channel (PUSCH)) that indicates a set of resource blocks (RB) s for the data transmission. The RBs may be indicated via a bitmap (a Type 0 allocation) or via indicating the starting RB index and the number of RBs allocated (a Type 1 allocation). In an SBFD time resource, and particularly in the case of multiple disjoint subbands, some of the RBs may be in a guard band or in the subband that is for the opposite direction of the scheduled data transmission. Accordingly, some of the allocated RBs for a data transmission may be unavailable for the transmission because they are in the guard band or in the subband in the opposite direction of the transmission.

The UE and/or the network entity may either apply rate matching for the scheduled data transmission based on the quantity of allocated RBs that are unavailable for transmission or may adjust the transport block size (TBS) for the scheduled data transmission based on the quantity of allocated RBs in the subband(s) in the same direction as the data transmission, as the TBS is set based on the number of allocated RBs for a transmission. As the quantity of RBs that are unavailable increases, rate matching, such as via reducing a modulation and coding scheme granularity, may lead to more inaccuracies. Accordingly, TBS adjustment may be used instead of rate matching, for example, in scenarios where the band is large or a large quantity of allocated RBs are in the guard band or in the subband in the opposite direction of the data transmission. In some examples, the network may indicate to the UE whether to rate match or adjust the TBS for a transmission in an SBFD time resource where the allocated RBs for the data transmission includes one or more RBs in the guard band or in the subband in the opposite direction of the data transmission. In some examples, the network may indicate a threshold percentage of allocated RBs or a threshold quantity of allocated RBs at which point to adjust the TBS instead of rate matching.

Aspects of the disclosure are initially described in the context of wireless communications systems. Aspects of the disclosure are further illustrated by and described with reference to resource diagrams, slot formats, process flows, apparatus diagrams, system diagrams, and flowcharts that relate to TBS determination in SBFD slots.

FIG. 1 illustrates an example of a wireless communications system 100 that supports TBS determination in SBFD slots in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support TBS determination in SBFD slots as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may implement an SBFD communication scheme, where a first set of frequency resources (which may include one or more non-contiguous subbands) may be used for communications in one direction (one or uplink or downlink), and a second set of frequency resources (which may include one or more non-contiguous subbands) may be used for communications in the other direction in a same time resource (e.g., the same slot or symbol). A UE 115 may receive scheduling information (e.g., via a DCI) for a data transmission (e.g., a PDSCH or a PUSCH) that indicates a set of RBs for the data transmission. The RBs may be indicated via a bitmap (a Type 0 allocation) or via indicating the starting RB index and the number of RBs allocated (a Type 1 allocation). In an SBFD time resource, and particularly in the case of multiple disjoint subbands, some of the RBs may be in a guard band or in the subband that is for the opposite direction of the scheduled data transmission. Accordingly, some of the allocated RBs for a data transmission may be unavailable for the transmission because they are in the guard band or in the subband in the opposite direction of the transmission.

The UE 115 and/or the network entity 105 may either apply rate matching for the scheduled data transmission based on the quantity of allocated RBs that are unavailable for transmission or may adjust the TBS for the scheduled data transmission based on the quantity of allocated RBs in the subband(s) in the same direction as the data transmission, as the TBS is set based on the number of allocated RBs for a transmission. As the quantity of RBs that are unavailable increases, rate matching may lead to more inaccuracies. Accordingly, TBS adjustment may be used instead of rate matching, for example, in scenarios where the band is large or a large quantity of allocated RBs are in the guard band or in the subband in the opposite direction of the data transmission. In some examples, the network may indicate to the UE 115 whether to rate match or adjust the TBS for a transmission in an SBFD time resource where the allocated RBs for the data transmission includes one or more RBs in the guard band or in the subband in the opposite direction of the data transmission. In some examples, the network may indicate a threshold percentage of allocated RBs or a threshold quantity of allocated RBs at which point to adjust the TBS instead of rate matching.

Figure 2:
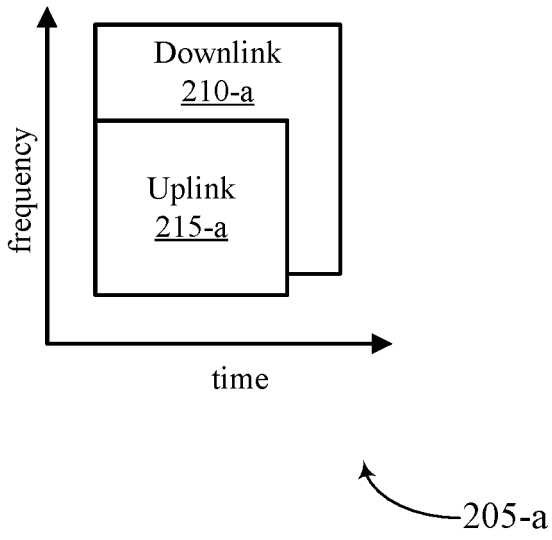
FIG. 2 illustrates an example of a resource diagram that supports TBS determination in SBFD slots in accordance with one or more aspects of the present disclosure.
Figure 2:
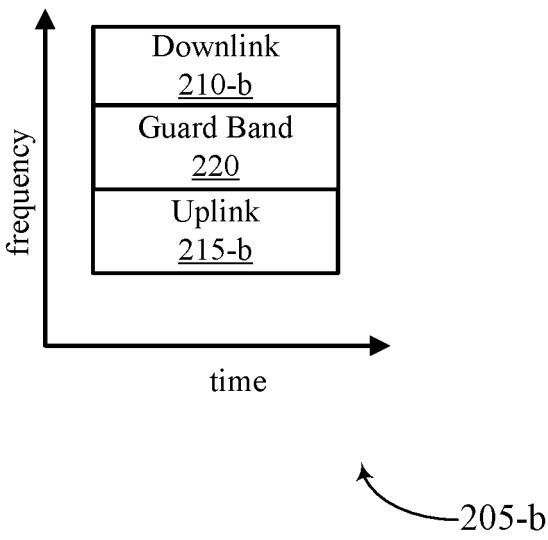

FIG. 2 illustrates an example of a resource diagram 200 that supports TBS determination in SBFD slots in accordance with one or more aspects of the present disclosure. The resource diagram 200 may implement or may be implemented by aspects of the wireless communications system 100.

As described herein, some wireless communications systems may implement full duplex communications. Full duplex communications may be in-band full duplex (IBFD) communications or subband FDD communications (e.g., flexible duplex).

A first example 205-*a* illustrates an IBFD example. In IBFD, a wireless device (e.g., a network entity 105 or a UE 115) may transmit and receive at the same time on the same frequency resource. For example, downlink resources 210-*a* and uplink resources 215-*a* may fully or partially overlap (e.g., the downlink resources 210-*a* and the uplink resources 215-*a* may share same IBFD time or frequency resources).

A second example 205-*b* illustrates a subband FDD example. In subband FDD, a wireless device (e.g., a network entity 105 or a UE 115) may transmit and receive at the same time but on different frequency resources. For example, the downlink resources 210-*b* may be separated from the uplink resources 215-*b* in the frequency domain (e.g., via a guard band 220). As described herein, in a subband FDD example, the UE 115 may receive scheduling information (e.g., via a DCI) for a data transmission (e.g., a PDSCH or a PUSCH) that indicates a set of RBs for the data transmission. Some of the RBs may be in the guard band 220 or in the subband that is for the opposite direction of the scheduled data transmission. For example, for an uplink data transmission (e.g., a PUSCH), some of the allocated RBs may be in the guard band 220 or the downlink resources 210-*b*, or for a downlink data transmission (e.g., a PDSCH), some of the allocated RBs may be in the guard band 220 or the uplink resources 215-*b*. Accordingly, as described herein, the UE 115 and the network entity 105 may either apply rate matching for the scheduled data transmission based on the quantity of allocated RBs that are unavailable for transmission (e.g., in the guard band 220 or in resources in the opposite direction of the scheduled data transmission) or may adjust the TBS for the scheduled data transmission based on the quantity of allocated RBs in the resources(s) in the same direction as the data transmission.

Figure 3:
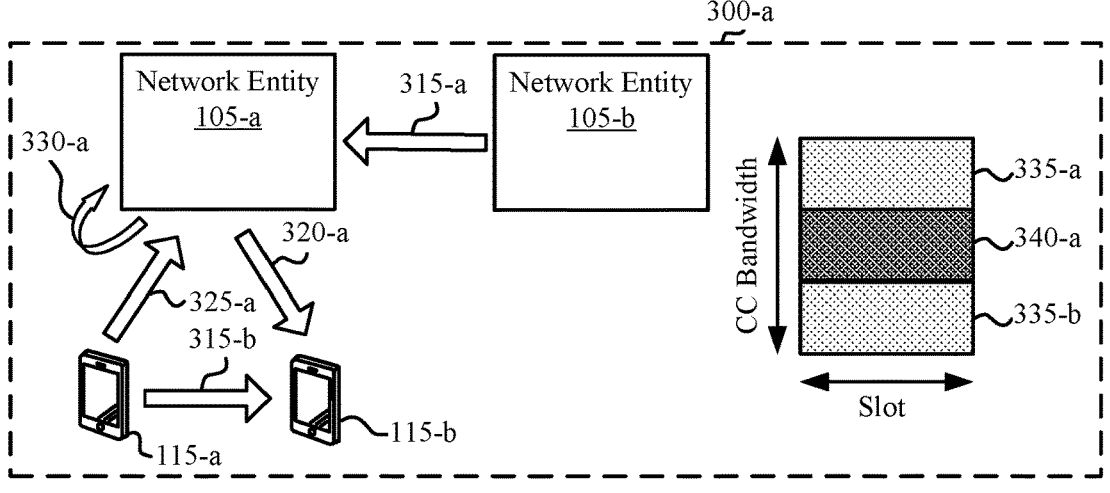
FIG. 3 illustrates examples of wireless communications systems that support TBS determination in SBFD slots in accordance with one or more aspects of the present disclosure.
Figure 3:
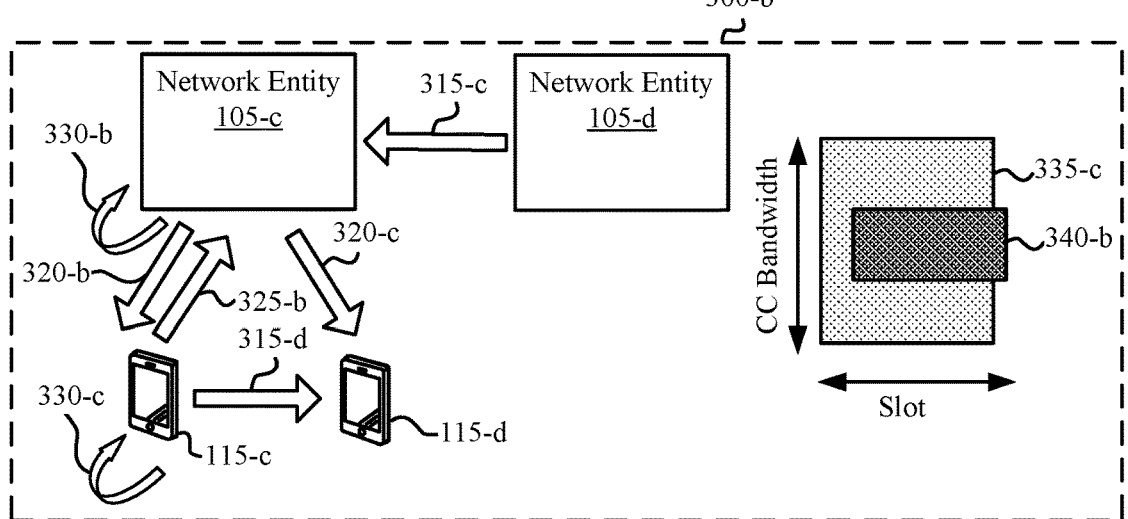
Figure 3:
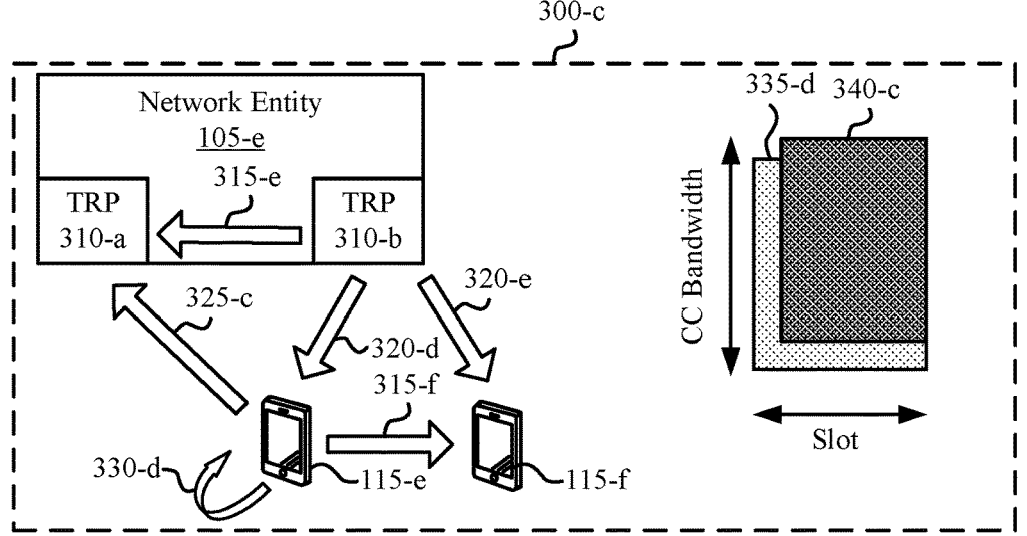

FIG. 3 illustrates an example of a wireless communications system 300-*a*, an example of a wireless communications system 300-*b*, and an example of a wireless communications system 300-*c* that support TBS determination in SBFD slots in accordance with one or more aspects of the present disclosure. The wireless communications system 300-*a*, the wireless communications system 300-*b*, and the wireless communications system 300-*c* may implement or may be implemented by aspects of the wireless communications system 100. For example, the wireless communications system 300-*a* may include a first UE 115-*a* and a second UE 115-*b*, the wireless communications system 300-*b* may include a first UE 115-*c* and a second UE 115-*d*, and the wireless communications system 300-*c* may include a first UE 115-*e* and a second UE 115-*f*, which may be examples of a UE 115 as described herein. The wireless communications system 300-*a* may include a network entity 105-*a* and a network entity 105-*b*, the wireless communications system 300-*b* may include a network entity 105-*c* and a network entity 105-*d*, and the wireless communications system 300-*c* may include a network entity 105-*e*, which may be examples of a network entity 105 as described herein.

The wireless communications system 300-*a* illustrates an example where the network entity 105-*a* operates in full duplex and each of the first UE 115-*a* and the second UE 115-*b* operates in half-duplex. For example, the network entity 105-*a* may transmit downlink signals 320-*a* to the second UE 115-*b* using downlink resources (e.g., downlink resources 335-*a* or downlink resources 335-*b*), and the first UE 115-*a* may transmit uplink signals 325-*a* to the network entity 105-*a* using uplink resources 340-*a*. The uplink resources 340-*a* may be non-overlapping with the downlink resources 335-*a*and the downlink resources 335-*b*. The uplink signals 325-*a* transmitted by the first UE 115-*a* may cause CLI 315-*b* at the second UE 115-*b*. Transmissions by the network entity 105-*b* may cause CLI 315-*a* at the network entity 105-*a*. Transmissions of the downlink signals 320-*a* by the network entity 105-*a* may cause self-interference 330-*a* at the network entity 105-*a* with respect to reception of the uplink signals 325-*a*.

The wireless communications system 300-*b* illustrates an example where the network entity 105-*c* operates in full duplex and the first UE 115-*c* operates in full duplex. For example, the network entity 105-*c* may transmit downlink signals 320-*b* to the first UE 115-*c* using downlink resources 335-*c*, and the first UE 115-*c* may transmit uplink signals 325-*b* to the network entity 105-*c* using uplink resources 340-*b*. The network entity 105-*c* may also transmit downlink signals 320-*c* to the second UE 115-*d*. The uplink resources 340-*b* may be overlapping with (e.g., partially or fully overlapping with) the downlink resources 335-*c*. The uplink signals 325-*b* transmitted by the first UE 115-*c* may cause CLI 315-*d* at the second UE 115-*d*. Transmissions by the network entity 105-*d* may cause CLI 315-*c* at the network entity 105-*c*. Transmissions of the downlink signals 320-*b* or the downlink signals 320-*c* by the network entity 105-*c* may cause self-interference 330-*b* at the network entity 105-*a* with respect to reception of the uplink signals 325-*b*. Transmissions of the uplink signals 325-*b* by the first UE 115-*c* may cause self-interference 330-*c* at the first UE 115-*c* with respect to reception of the downlink signals 320-*b*.

The wireless communications system 300-*c* illustrates an example where the network entity includes multiple TRPs (e.g., a first TRP 310-*a* and a second TRP 310-*b*) and operates in full duplex, and the first UE 115-*e* operates in full duplex. For example, the first UE 115-*e* may support SBFD (SBFD) operation. For example, the second TRP 310-*b* may transmit downlink signals 320-*d* to the first UE 115-*e* using downlink resources 335-*d* and the second TRP 310-*b* may transmit downlink signals 320-*e* to the second UE 115-*f* using the downlink resources 335-*d*. The first UE 115-*e* may transmit uplink signals 325-*c* to the first TRP 310-*a* using uplink resources 340-*c*. The uplink resources 340-*c* may be overlapping with (e.g., partially or fully overlapping with) the downlink resources 335-*d*. Transmissions by the second TRP 310-*b* of the downlink signals 320-*d* and the downlink signals 320-*e* may cause CLI 315-*e* at the first TRP 310-*a*. The uplink signals 325-*c* transmitted by the first UE 115-*e* may cause CLI 315-*f* at the second UE 115-*f*. Transmissions of the uplink signals 325-*c* by the first UE 115-*e* may cause self-interference 330-*d* at the first UE 115-*e* with respect to reception of the downlink signals 320-*d*.

Some wireless communications systems may include TDD bands only. Some wireless communications systems (e.g., the wireless communications system 300-*a*), may include full duplex operation at the network and half-duplex operation at the UE. Some wireless communications systems may support SBFD (e.g., no overlapping between downlink and uplink frequency resources).

In some cases, if a UE 115 is operating in a half-duplex mode and the network entity 105 is operating in an SBFD/IBFD mode, the UE 115 may experience several sources of interference. For example, a UE 115 may experience inter-cell interference from other network entities 105 (e.g., in the wireless communications system 300-*b*, the second UE 115-*d* may experience CLI 315 caused by downlink transmissions by the network entity 105-*d*). As another example, a UE 115 may experience intra-cell interference from UEs 115 in the same cell (e.g., CLI 315-*b*, CLI 315-*d*, or CLI 315-*f* as shown in the wireless communications system 300-*a*, the wireless communications system 300-*b*, and the wireless communications system 300-*c*, respectively). As another example, a UE 115 may experience inter-cell CLI 315 from UEs 115 in adjacent cells (e.g., in the wireless communications system 300-b, the second UE 115-d may experience CLI 315 caused by UEs 115 in a neighboring cell). Additionally, full duplex UEs 115 may experience self-interference (e.g., self-interference 330-c at the first UE 115-c in the wireless communications system 300-b).

Figure 4:
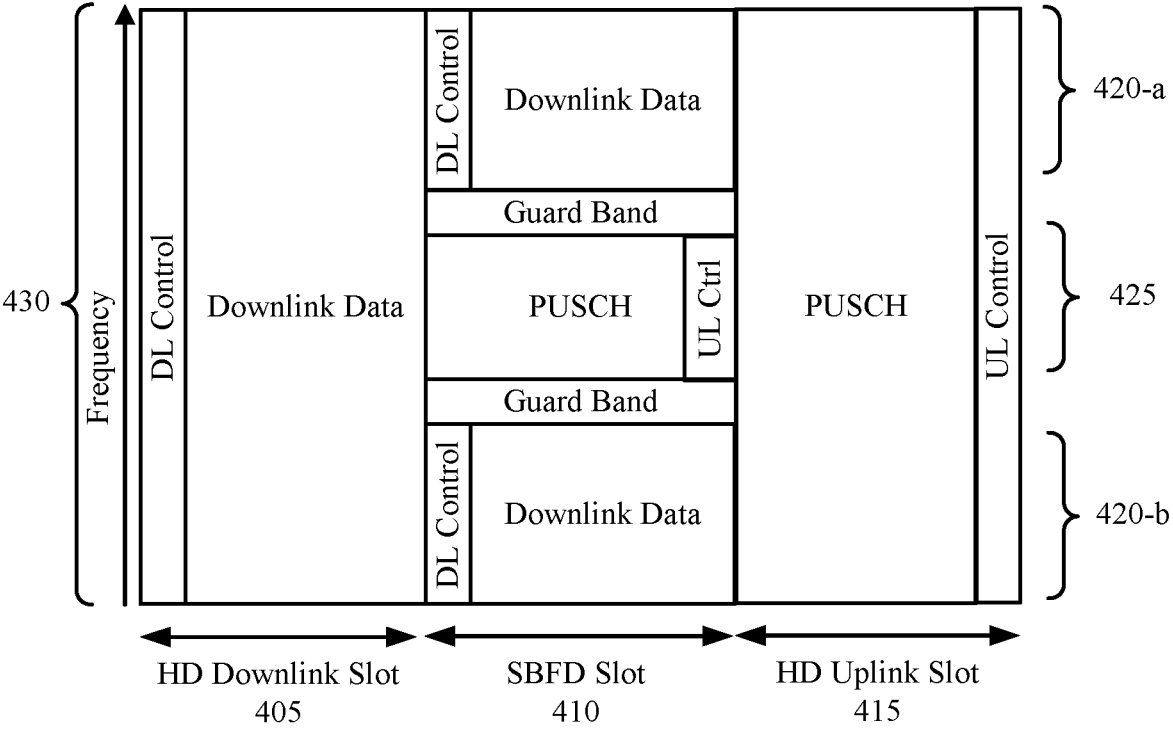
FIG. 4 illustrates an example of a slot format that supports TBS determination in SBFD slots in accordance with one or more aspects of the present disclosure.

FIG. 4 illustrates an example of a slot format 400 that supports TBS determination in SBFD slots in accordance with one or more aspects of the present disclosure. The slot format 400 may implement or may be implemented by aspects of the wireless communications system 100, the wireless communications system 300-a, the wireless communications system 300-b, or the wireless communications system 300-c.

The slot format 400 illustrates an example half-duplex downlink slot 405, an SBFD slot 410, and a half-duplex uplink slot 415 for a carrier bandwidth 430. The half-duplex downlink slot 405 includes a downlink control region (e.g., resources for downlink control (e.g., resources for a physical downlink control channel (PDCCH) which may convey a DCI) and a downlink data region (e.g., resources for PDSCH). The half-duplex uplink slot 415 includes an uplink data region (e.g., resources for PUSCH) and an uplink control region (e.g., resources for uplink control (e.g., resources for a physical uplink control channel (PUCCH) which may convey uplink control information (UCI)).

The SBFD slot 410 includes a BWP including a first downlink subband 420-a and a second downlink subband 420-b. In a 'D+U' slot, as in SBFD slot 410, the carrier bandwidth 430 may be used for both uplink and downlink transmissions. As illustrated in FIG. 4, the SBFD slot 410 includes an uplink BWP including an uplink subband 425. Guard bands may separate the first downlink subband 420-a and the second downlink subband 420-b from the uplink subband 425. The first downlink subband 420-a includes a downlink control region and a downlink data region. The second downlink subband 420-b includes a downlink control region and a downlink data region. The uplink subband 425 includes a PUSCH region and an uplink control region. In some examples, in a 'D+U' slot, downlink and uplink transmissions may occur in overlapping frequency bands (e.g., IBFD operation). In some examples, in a 'D+U' slot, as shown in SBFD slot 410, downlink and uplink transmissions may occur in adjacent, non-overlapping bands. If scheduled with a 'D+U' slot, a half-duplex UE 115 may either transmit in the uplink band (e.g., the uplink subband 425) or receive in the downlink band (e.g., the first downlink subband 420-a and the second downlink subband 420-b). If scheduled with a 'D+U' slot, a full duplex UE 115 (e.g., a UE 115 that supports simultaneous transmission and reception) may transmit in the uplink band (e.g., the uplink subband 425) or receive in the downlink band (e.g., the first downlink subband 420-a and the second downlink subband 420-b). A 'D+U' slot may include downlink symbols, uplink symbols, or full duplex symbols.

In SBFD, a network entity 105 may configure a downlink transmission to a UE 115 in frequency domain resources adjacent to the frequency domain resources configured for uplink transmission for another UE 115. For example, in the SBFD slot 410, a first UE 115 may transmit an uplink transmission in the uplink subband 425 and a second UE 115 may simultaneously receive a downlink transmission in the first downlink subband 420-a and/or the second downlink subband 420-b. The uplink transmission of the first UE 115 may cause CLI to the downlink reception at the second UE 115. CLI may be caused by energy leakage caused by timing and frequency misalignment between the two UEs 115, or may be caused by automatic gain control (AGC) mismatch if the AGC of the second UE 115 is driven by a downlink serving signal of the second UE 115 but the CLI is strong enough to saturate the AGC of the second UE 115.

Figure 5:
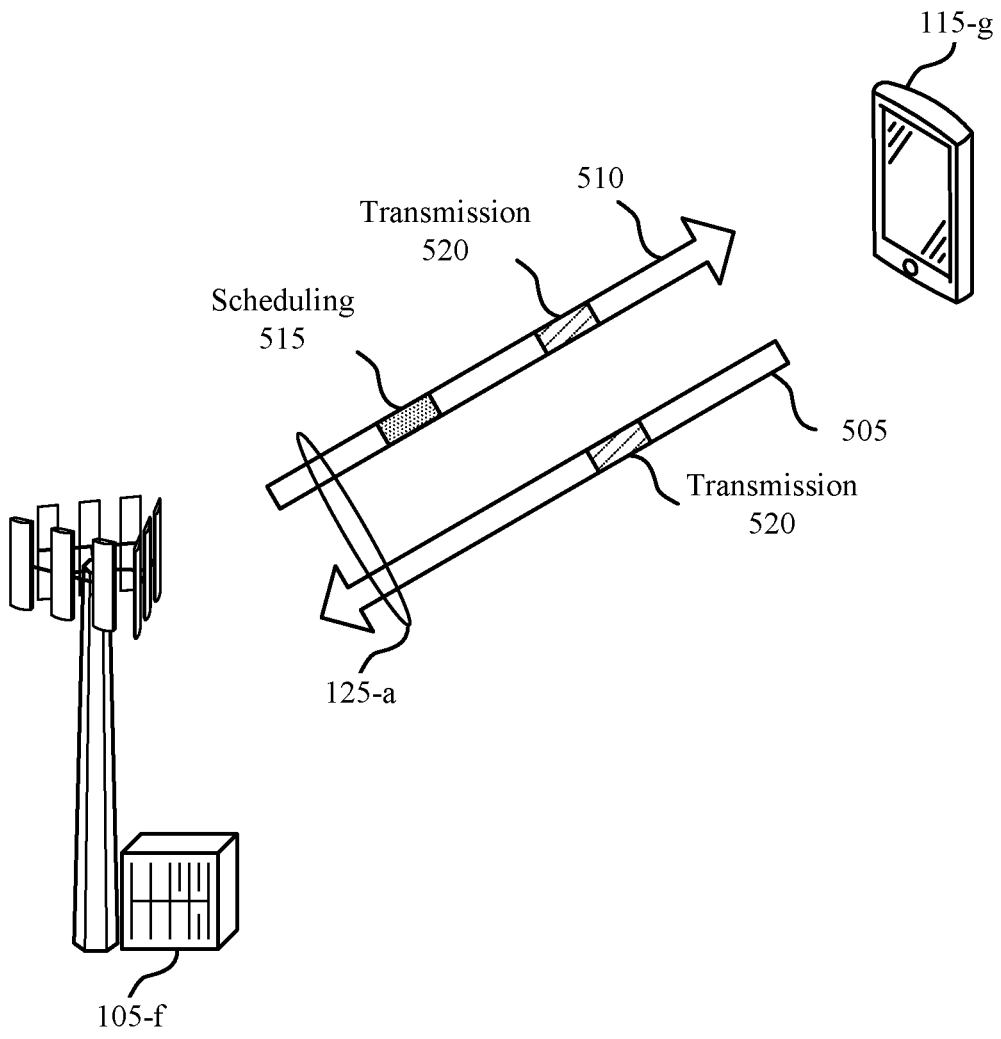
FIG. 5 illustrates an example of a wireless communications system that supports TBS determination in SBFD slots in accordance with one or more aspects of the present disclosure.

FIG. 5 illustrates an example of a wireless communications system 500 that supports TBS determination in SBFD slots in accordance with one or more aspects of the present disclosure. The wireless communications system 500 may implement or may be implemented by aspects of the wireless communications system 100, the wireless communications system 300-a, the wireless communications system 300-b, or the wireless communications system 300-c. For example, the wireless communications system 500 may include a UE 115-g and a network entity 105-f, which may be a examples of a UE 115 and a network entity 105, respectively, as described herein.

The UE 115-g may communicate with the network entity 105-f using a communication link 125-a. The communication link 125-a may be an example of an NR or LTE link between the UE 115-g and the network entity 105-f. The communication link 125-a may include bi-directional links that enable both uplink and downlink communications. For example, the UE 115-g may transmit uplink signals 505 (e.g., uplink transmissions), such as uplink control signals or uplink data signals, to the network entity 105-f using the communication link 125-a and the network entity 105-f may transmit downlink signals 510 (e.g., downlink transmissions), such as downlink control signals or downlink data signals, to the UE 115-g using the communication link 125-a.

In some examples of the wireless communications system 500, one or more of the UE 115-g and the network entity 105-f may operate in accordance with an SBFD scheme. That is, one or more of the UE 115-g and the network entity 105-f may communicate uplink signals 505 and downlink signals 510 in overlapping time resources, with separate frequency resources (e.g., separated by a guard band) as described with reference to FIG. 2 and FIG. 4. In some examples, for example as described with reference to FIG. 4, an SBFD slot may include multiple disjoint downlink bands (e.g., separated by one or more of uplink bands or guard bands) or multiple disjoint uplink bands (e.g., separated by one or more of downlink bands or guard bands).

The network entity 105-f may indicate, in scheduling information 515 (e.g., in a DCI), a resource allocation for communicating a transmission 520. The resource allocation may indicate, for example, time and frequency resources for communicating the transmission 520. In a Type 0 resource allocation, the resource allocation may be indicated by a bitmap, and accordingly may be disjoint. For a Type 0 allocation the allocation may be in terms of RB groups (RBG)s. The RBG size may depend on the BWP size configured for the UE 115-g and a configuration type (e.g., a configuration type 2 may include RGBs twice as large as configuration type 1). For a Type 1 resource allocation, a set of consecutive RBs may be indicated by a starting RB index and a quantity of consecutive RBs, which are combined in a resource indicator value (RIV) field of the DCI. In some examples, for a Type 1 resource allocation, if $(L_{RBs}-1)$ $\leq \lfloor N_{BWP}^{size}/2 \rfloor$ then $RIV = N_{BWP}^{size}(L_{RBs}-1)+RB_{start}$ else $RIV = N_{BWP}^{size}(N_{BWP}^{size}-L_{RBs}+1)+(N_{BWP}^{size}-1-RB_{start})$, where $L_{RBs}$ refers to the quantity of RBs allocated, $N_{BWP}^{size}$ refers to the size of the BWP configured for the UE 115 in RBs, and $RB_{start}$ refers to the first indexed RB indicated by the Type 1 resource allocation.

The TBS for a transmission 520 may be determined based on the number of RBs allocated by the scheduling information 515 for the transmission 520. For example, a total number of REs allocated for a transmission such as a PDSCH or a PUSCH, ($N_{RE}$), may be given by $N_{RE}$=min (156, $N'_{RE}$)·$n_{PRB}$=$N'_{RE}$*$n_{PRB}$, where $n_{PRB}$ is the total number of allocated PRBs for the transmission, and $N'_{RE}$ is the quantity of RSs allocated for the transmission within a PRB.

As described herein, in an SBFD scenario, some of the RBs allocated for the transmission 520 may be in guard bands or in subbands in the opposite direction of the communication direction of the transmission 520. For example, if the transmission 520 is a downlink transmission, the UE 115-*g* may not communicate the transmission 520 in RBs which fall outside of the downlink bands (e.g., which overlap partially or fully with the uplink bands or guard bands). As another example, if the transmission 520 is an uplink transmission, the UE 115-*g* may not communicate the transmission 520 in RBs which fall outside of the uplink bands (e.g., which overlap partially or fully with the downlink bands or guard bands). In some examples, the UE 115-*g* may perform rate matching for the RBs which fall outside of an intended frequency band. In some examples, (e.g., if a large amount of RBs fall outside of the frequency band in the same direction as the transmission 520), the UE 115-*g* may determine an adjusted TBS by subtracting the resources that fall outside of the frequency band in the same direction as the transmission 520. In some examples, the UE 115-*g* may be configured (e.g., RRC configured) to either perform rate matching, TBS determination, or to consider resources which fall outside of the intended frequency band to be available for transmission. In some other examples, the UE 115-*g* may be configured (e.g., RRC configured) with a rule for determining if the UE 115-*g* should apply rate matching or TBS determination (e.g., based on a threshold quantity of RBs which fall outside of the intended frequency band).

Figure 6:
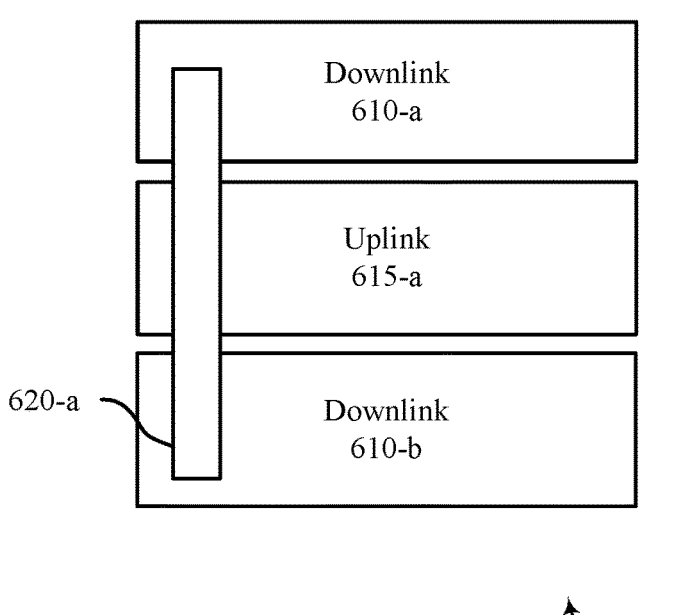
FIG. 6 illustrates an example of a resource diagram that supports TBS determination in SBFD slots in accordance with one or more aspects of the present disclosure.
Figure 6:
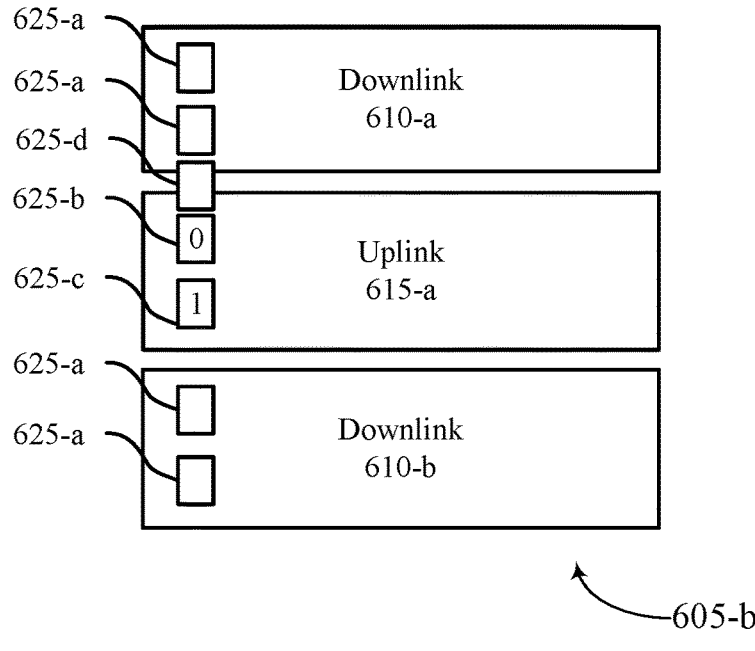

FIG. 6 illustrates an example of a resource diagram 600 that supports TBS determination in SBFD slots in accordance with one or more aspects of the present disclosure. The resource diagram 600 may implement or may be implemented by aspects of the wireless communications system 100. For example, the resource diagram 600 may be implemented by a UE 115 and/or a network entity 105 as described herein.

A first resource diagram 605-*a* illustrates an example in which a UE 115 receives a Type 1 resource allocation, as described with reference to FIG. 5. The resource allocation may indicate RBs 620-*a* within a first downlink subband 610-*a*, an uplink subband 615-*a*, a second downlink subband, and guard bands between the uplink subband and downlink subbands. If the transmission is an uplink transmission, the UE 115 may only be able to transmit the uplink transmission in the RBs within the uplink subband 615-*a*. If the transmission is a downlink transmission, the UE 115 may only be able to receive the downlink transmission the RBs within the first downlink subband 610-*a* and the second downlink subband 610-*b*. Accordingly, in some examples, when the allocated RBs 620-*a* for a downlink transmission or an uplink transmission overlap with guard bands or subbands in the opposite direction, the UE 115 may not include the RBs that overlap with the guard bands or the subbands in the opposite direction in the TBS size calculation for the transmission. For example, the UE 115 may calculate a TBS according to $$N_{RE} = \min(156, N'_{RE}) * n_{PRB}^{SBFD}, \text{ where } n_{PRB}^{SBFD} = n_{PRB} - n_{PRB}^{overlap}, n_{PRB}$$

is the total number of RBs 620-*a* in the resource allocation, and $n_{PRB}^{overlap}$ refers to the number of RBs that overlap with the guard bands or the subbands in the opposite direction. As described herein, the UE 115 may receive signaling indicating whether to rate match or adjust the TBS calculation when the allocated RBs for a downlink transmission or an uplink transmission overlap with guard bands or subbands in the opposite direction of the transmission.

As another example, for a downlink transmission, the UE 115 may calculate $$N'_{RE} = N_{SC}^{RB} N_{symb}^{sh} - N_{DMRS}^{PRB} - N_{oh}^{PRB} - N_{SBFD},$$

where $N_{RE}$ may be defined as the number of of REs within a slot, $N'_{RE}$ may be a number of REs allocated for a PDSCH within a physical RB (PRB), given by $$N'_{RE} = N_{sc}^{RB} * N_{symb}^{sh} - N_{DMRS}^{PRB} - N_{oh}^{PRB}, \text{ where } N_{sc}^{RB} = 12, N_{symb}^{sh}$$

is the number of symbols of the PDSCH allocation within the slot, $N_{DMRS}^{PRB}$ is the number of REs for demodulation reference signals (DMRSs) per PRB in the scheduled duration including the overhead of the DMRS code division multiplexing (CDM), and $$N_{oh}^{PRB}$$

is an overhead (e.g., configured by a higher-layer parameter xOverhead in PDSCH-ServingCellConfig), and $N_{SBFD}$ is the percentage of allocated resources falling outside the first downlink subband 610-*a* and the second downlink subband 610-*b*. Similar calculations may be performed for uplink transmissions.

A second resource diagram 605-*b* illustrates an example in which a UE 115 receives a Type 0 resource allocation, as described with reference to FIG. 5. In Type 0 resource allocation, a UE 115 receives a bitmap in the scheduling DCI that indicates the RBs included in the resource allocation for the scheduled transmission. As described herein, a UE 115 may be unable to transmit an uplink transmission in RBs in the downlink subbands (e.g., the first downlink subband 610-*a* or the second downlink subband 610-*b*) or the guard bands and the UE 115 may be unable to receive a downlink transmission in the uplink subband 615-*a* or the guard bands.

For example, as shown in the second resource diagram 605-*b*, for a downlink transmission (e.g., a PDSCH), the UE 115 may receive a bitmap that indicates a set of bits corresponding to PRGs 625 allocated for the downlink transmission. Some PRGs 625-*a* may be included in the downlink subbands (e.g., the first downlink subband 610-*a* or the second downlink subband 610-*b*), and accordingly may be used for the downlink transmission. PRGs that at least partially overlap with the uplink subband 615-*a* or the guard bands (e.g., the PRG 625-*b* and the PRG 625-*c*) may not be used to receive the downlink transmission. In some examples, the bits in the bitmap corresponding to PRGs 625 contained within the uplink subband 615-*a* (e.g., the PRG 625-*b* and the PRG 625-*c*) may indicate whether the UE 115 should rate match those PRGs or remove those PRGs 625 from the TBS calculation. For example, a "1" may indicate to rate match and a "0" may indicate to remove the PRG from the TBS calculation. Accordingly, the UE 115 may remove the PRG 625-*b* from the TBS calculation and may rate match for the PRG 625-*c*. Accordingly, $$n_{PRB}^{overlap},$$

as described with reference to the first resource diagram 605-*a*, may be dependent on the quantity of "1"s indicated in the frequency domain resource allocation (FDRA) corresponding to RGBs that are not in the downlink subbands (e.g., the first downlink subband 610-*a* or the second downlink subband 610-*b*). In some examples, edge PRBs 625-*d* (e.g., a PRB that partially overlaps with the subband in the same direction as the scheduled transmission) may be rate matched or accounted for in the TBS calculation according to a fixed rule (e.g., either in accordance with signaling or a configured threshold as described herein).

Figure 7:
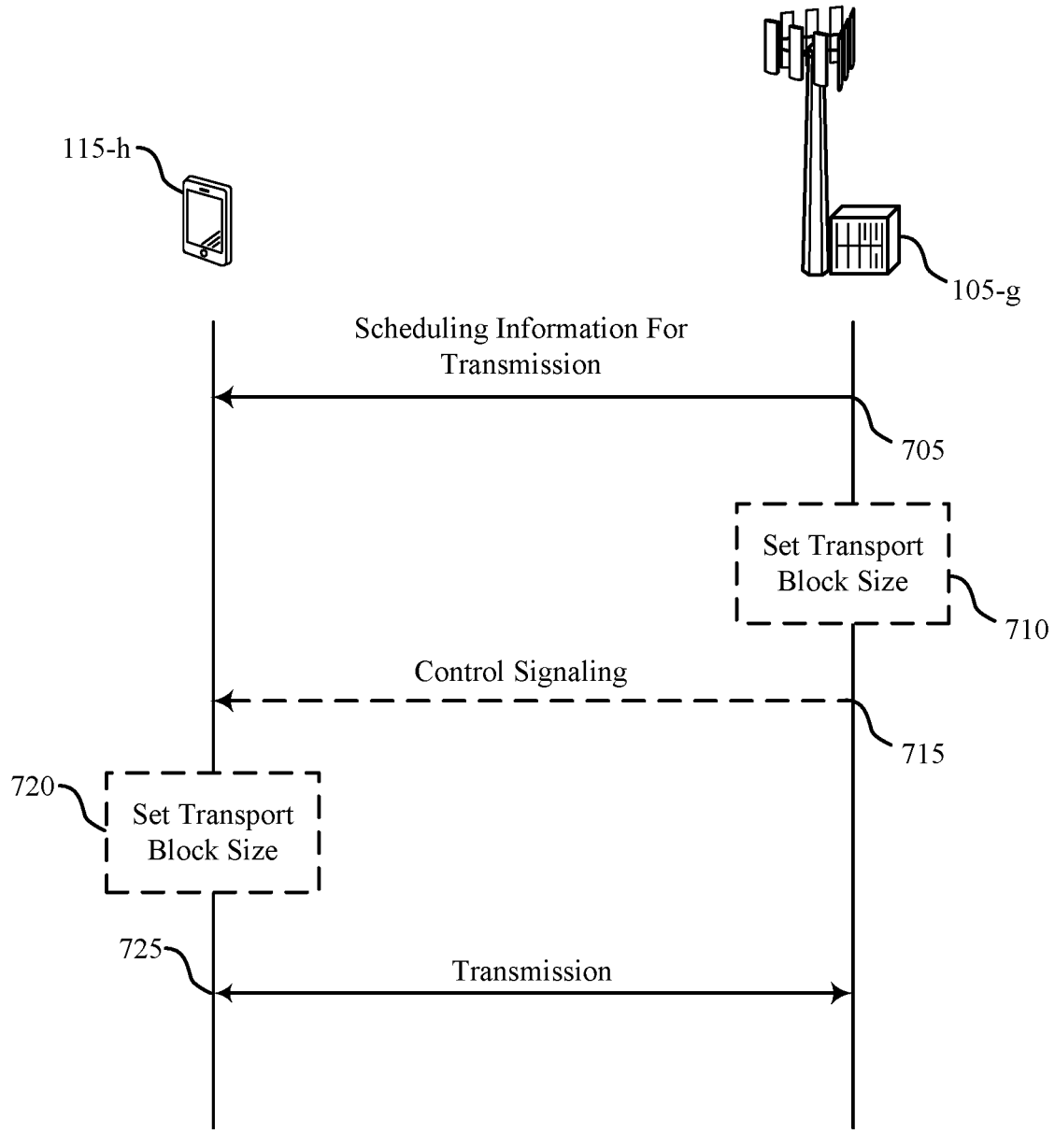
FIG. 7 illustrates an example of a process flow that supports TBS determination in SBFD slots in accordance with one or more aspects of the present disclosure.

FIG. 7 illustrates an example of a process flow 700 that supports TBS determination in SBFD slots in accordance with one or more aspects of the present disclosure. The process flow 700 may implement or be implemented by aspects of wireless communications system 100, the wireless communications system 300-*a*, the wireless communications system 300-*b*, the wireless communications system 300-*c*, or the wireless communications system 500. For example, the process flow 700 may include a UE 115-*h*, which may be an example of a UE 115 as described herein. The process flow 700 may also include a network entity 105-*g*, which may be an example of a network entity 105 as described herein. In the following description of the process flow 700, the operations between the network entity 105-*g* and the UE 115-*h* may be transmitted in a different order than the example order shown, or the operations performed by the network entity 105-*g* and the UE 115-*h* may be performed in different orders or at different times. Some operations may also be omitted from the process flow 700, and other operations may be added to the process flow 700.

At 705, the network entity 105-*g* may transmit, to the UE 115-*h*, scheduling information for a transmission in a first communication direction during a time resource associated with SBFD communications. That is, the time resource may be associated with a first subband allocated for a first communication direction (e.g., one or uplink or downlink) and a second subband allocated for a second communication direction (e.g., the other of uplink or downlink), as described with reference to FIG. 2 and FIG. 6. In some examples, the time resource may additionally be associated with a third subband allocated for the first communication direction.

The scheduling information may indicate a set of RBs for the transmission. For example, the scheduling information may indicate a first RB and a quantity of consecutive RBs for the transmission (e.g., a Type 1 allocation). In some examples, the scheduling information may include a bitmap indicating the set of RBs (e.g., a Type 0 allocation). That is, each bit of the bitmap may correspond to an RB or PRG and may indicate if the corresponding RB or PRG is allocated for the transmission.

In some examples, at 710, the network entity 105-*g* may determine a TBS of the transmission based on a quantity of RBs which fall within the first subband or the third subband (e.g., which do not overlap with the second subband or any guard bands).

In some examples, at 715, the network entity 105-*g* may transmit control signaling to the UE 115-*h*. The control signaling may indicate for the UE 115-*h* to set the TBS of the transmission based on the quantity of RBs which fall within the first subband or the third subband. In some other examples, the control signaling may indicate for the UE 115-*h* to perform rate matching. In some other examples, the control signaling may indicate for the UE 115-*h* to either determine the TBS of the transmission or perform rate matching based on a threshold quantity of RBs which overlap (e.g., partially or fully) with the second subband (e.g., or a guard band).

In some examples, at 720, the UE 115-*h* may set the TBS of the transmission. For example, the UE 115-*h* may determine the TBS based on a quantity of RBs which overlap (e.g., partially or fully) with the second subband or a guard band. In some examples, the bits of the bitmap corresponding to RBs outside of the first subband and the third band may indicate if the UE 115-*h* should rate match or adjust the TBS for the corresponding RBs for the transmission.

At 725, the UE 115-*h* and the network entity 105-*g* may communicate the transmission during the time resource. In some examples (e.g., if the first communication direction is an uplink direction), the UE 115-*h* may transmit the transmission (e.g., via a PUSCH) to the network entity 105-*g* in the time resource with the TBS. In some other examples (e.g., if the first communication direction is a downlink direction), the network entity 105-*g* may transmit the transmission (e.g., via a PDSCH) to the UE 115-*g* in the time resource with the TBS.

In some examples, the UE 115-*h* and the network entity 105-*g* may communicate the transmission with a TBS based on a total quantity of RBs of the set of RBs. In such examples, the UE 115-*h* and the network entity 105-*g* may perform rate matching based on the quantity of RBs which overlap with the second subband or the guard bands.

Figure 8:
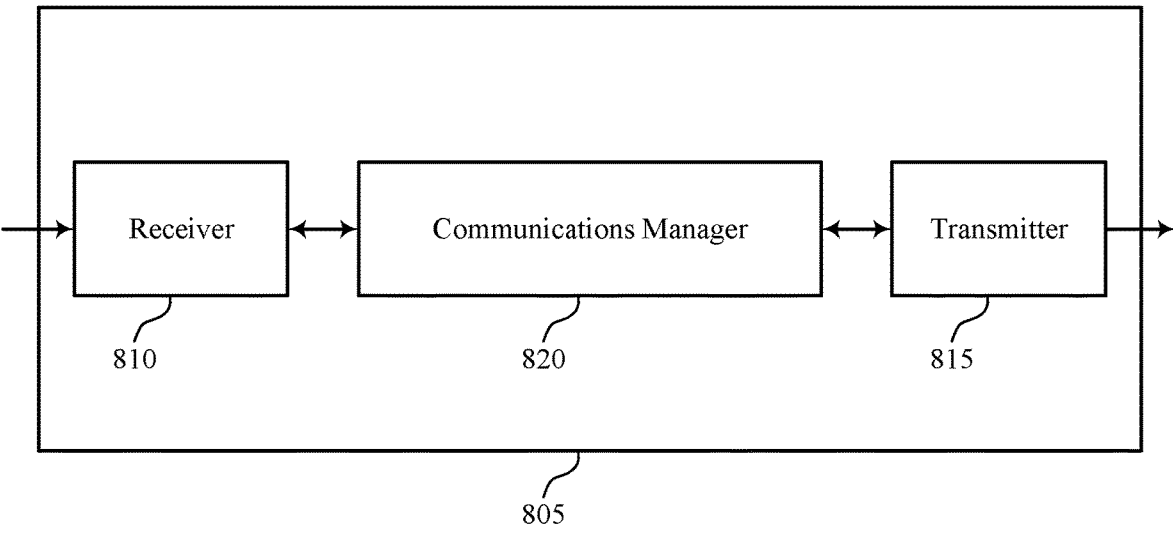
FIGS. 8 and 9 illustrate block diagrams of devices that support TBS determination in SBFD slots in accordance with one or more aspects of the present disclosure.

FIG. 8 illustrates a block diagram 800 of a device 805 that supports TBS determination in SBFD slots in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to TBS determination in SBFD slots). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to TBS determination in SBFD slots). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of TBS determination in SBFD slots as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for receiving scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The communications manager 820 may be configured as or otherwise support a means for communicating the transmission during the time resource, where a TBS of the transmission is based on the at least one RB at least partially overlapping with the second subband or the guard band.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for more efficient utilization of communication resources.

Figure 9:
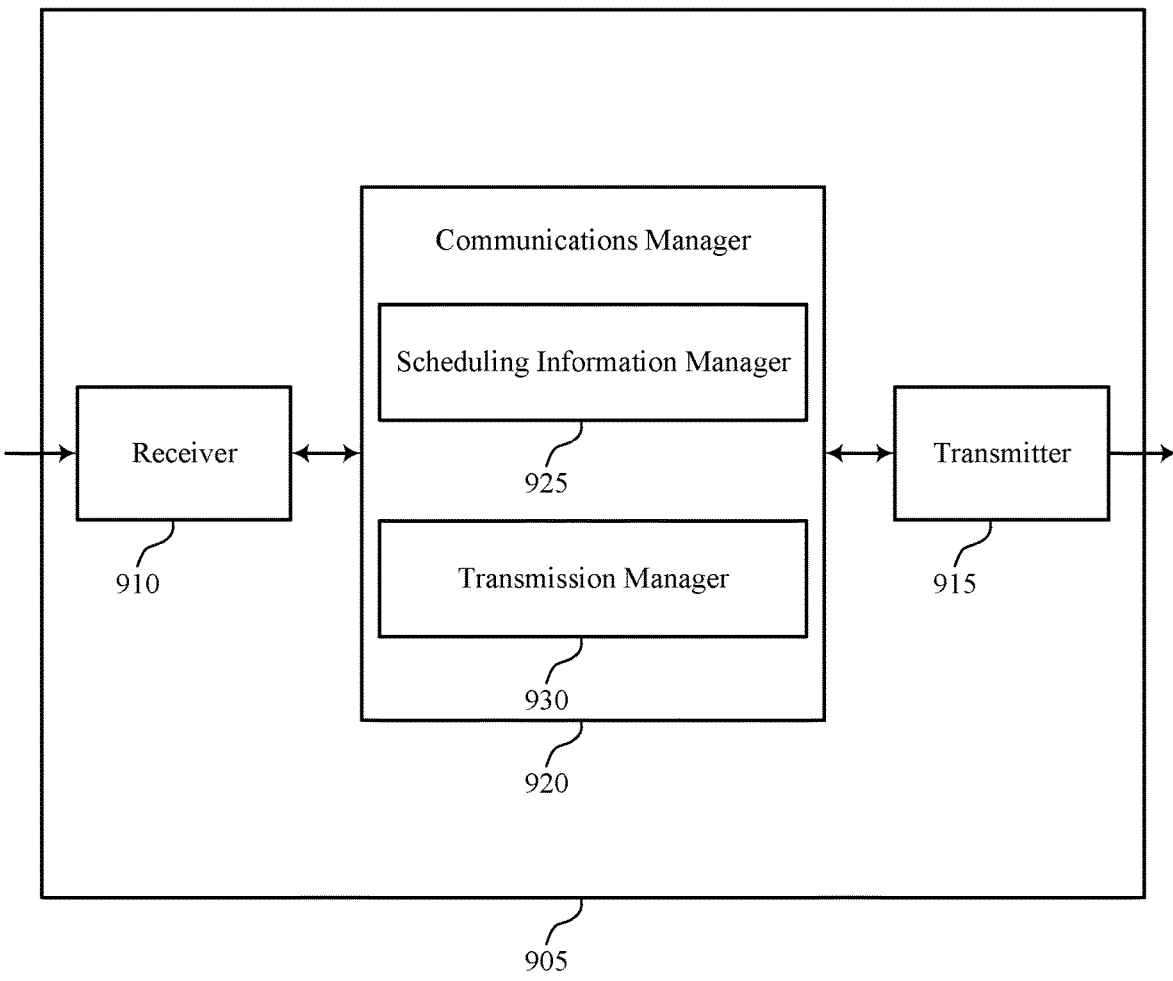

FIG. 9 illustrates a block diagram 900 of a device 905 that supports TBS determination in SBFD slots in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to TBS determination in SBFD slots). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to TBS determination in SBFD slots). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of TBS determination in SBFD slots as described herein. For example, the communications manager 920 may include a Scheduling Information Manager 925 a Transmission Manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The Scheduling Information Manager 925 may be configured as or otherwise support a means for receiving scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The Transmission Manager 930 may be configured as or otherwise support a means for communicating the transmission during the time resource, where a TBS of the transmission is based on the at least one RB at least partially overlapping with the second subband or the guard band.

Figure 10:
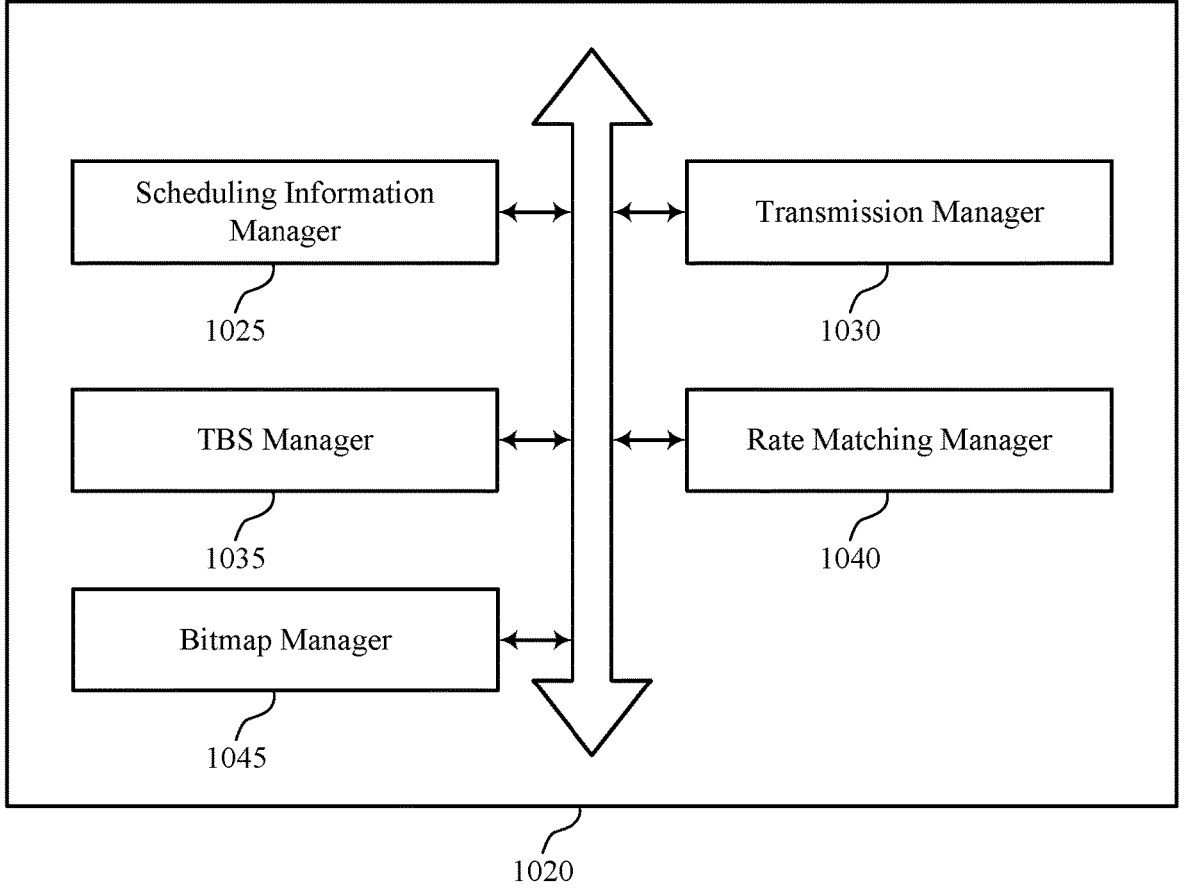
FIG. 10 illustrates a block diagram of a communications manager that supports TBS determination in SBFD slots in accordance with one or more aspects of the present disclosure.

FIG. 10 illustrates a block diagram 1000 of a communications manager 1020 that supports TBS determination in SBFD slots in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of TBS determination in SBFD slots as described herein. For example, the communications manager 1020 may include a Scheduling Information Manager 1025, a Transmission Manager 1030, a TBS manager 1035, a Rate Matching Manager 1040, or any combination thereof. Each of these components may communicate, directly or indirectly, with one another (e.g., via one or more buses).

The communications manager 1020 may support wireless communications at a UE in accordance with examples as disclosed herein. The Scheduling Information Manager 1025 may be configured as or otherwise support a means for receiving scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The Transmission Manager 1030 may be configured as or otherwise support a means for communicating the transmission during the time resource, where a TBS of the transmission is based on the at least one RB at least partially overlapping with the second subband or the guard band.

In some examples, to support communicating the transmission during the time resource, the TBS manager 1035 may be configured as or otherwise support a means for setting the TBS of the transmission based on a quantity of RBs of the set of RBs within the first subband or a third subband associated with the first communication direction.

In some examples, the TBS manager 1035 may be configured as or otherwise support a means for receiving control signaling indicating to set the TBS of transmissions in the first communication direction that are scheduled with at least one RB that at least partially overlaps with the second subband or the guard band based on respective quantities of RBs scheduled for the transmissions that are associated with the first communication direction.

In some examples, the TBS manager 1035 may be configured as or otherwise support a means for receiving control signaling indicating to set the TBS of transmissions in the first communication direction that are scheduled with a threshold quantity of RBs that at least partially overlaps with the second subband or the guard band based on respective quantities of RBs scheduled for the transmissions that are associated with the first communication direction, where a second quantity of RBs of the set of RBs that at least partially overlap with the second subband or the guard band satisfy the threshold quantity.

In some examples, to support communicating the transmission during the time resource, the TBS manager 1035 may be configured as or otherwise support a means for setting the TBS of the transmission based on a total quantity of RBs of the set of RBs. In some examples, to support communicating the transmission during the time resource, the Rate Matching Manager 1040 may be configured as or otherwise support a means for rate matching data of the transmission based on a second quantity of RBs of the set of RBs that at least partially overlap with the second subband or the guard band.

In some examples, the Rate Matching Manager 1040 may be configured as or otherwise support a means for receiving control signaling indicating to rate match data of transmissions in the first communication direction that are scheduled with at least one RB that at least partially overlaps with the second subband or the guard band.

In some examples, to support receiving the scheduling information, the Bitmap Manager 1045 may be configured as or otherwise support a means for receiving a bitmap indicating the set of RBs, where each bit of the bitmap corresponds to a RB that at least partially overlaps with the second subband or the guard band indicates whether to rate match the transmission for that RB or to set the TBS for the transmission based on that RB at least partially overlapping with the second subband or the guard band.

In some examples, the Scheduling Information Manager 1025 may be configured as or otherwise support a means for receiving control signaling indicating the time resource is associated with SBFD communications.

In some examples, the SBFD communications includes a third subband associated with the first communication direction. In some examples, the set of RBs includes a first subset of RBs in the first subband, a second subset of RBs in the second subband, and a third subset of RBs in the third subband. In some examples, communicating the transmission includes communicating the transmission via the first subset of RBs and the third subset of RBs.

In some examples, to support communicating the transmission, the Transmission Manager 1030 may be configured as or otherwise support a means for transmitting via an uplink shared channel, where the first communication direction is an uplink direction and the second communication direction is a downlink direction.

In some examples, to support communicating the transmission, the Transmission Manager 1030 may be configured as or otherwise support a means for receiving via a downlink shared channel, where the first communication direction is a downlink direction and the second communication direction is an uplink direction.

Figure 11:
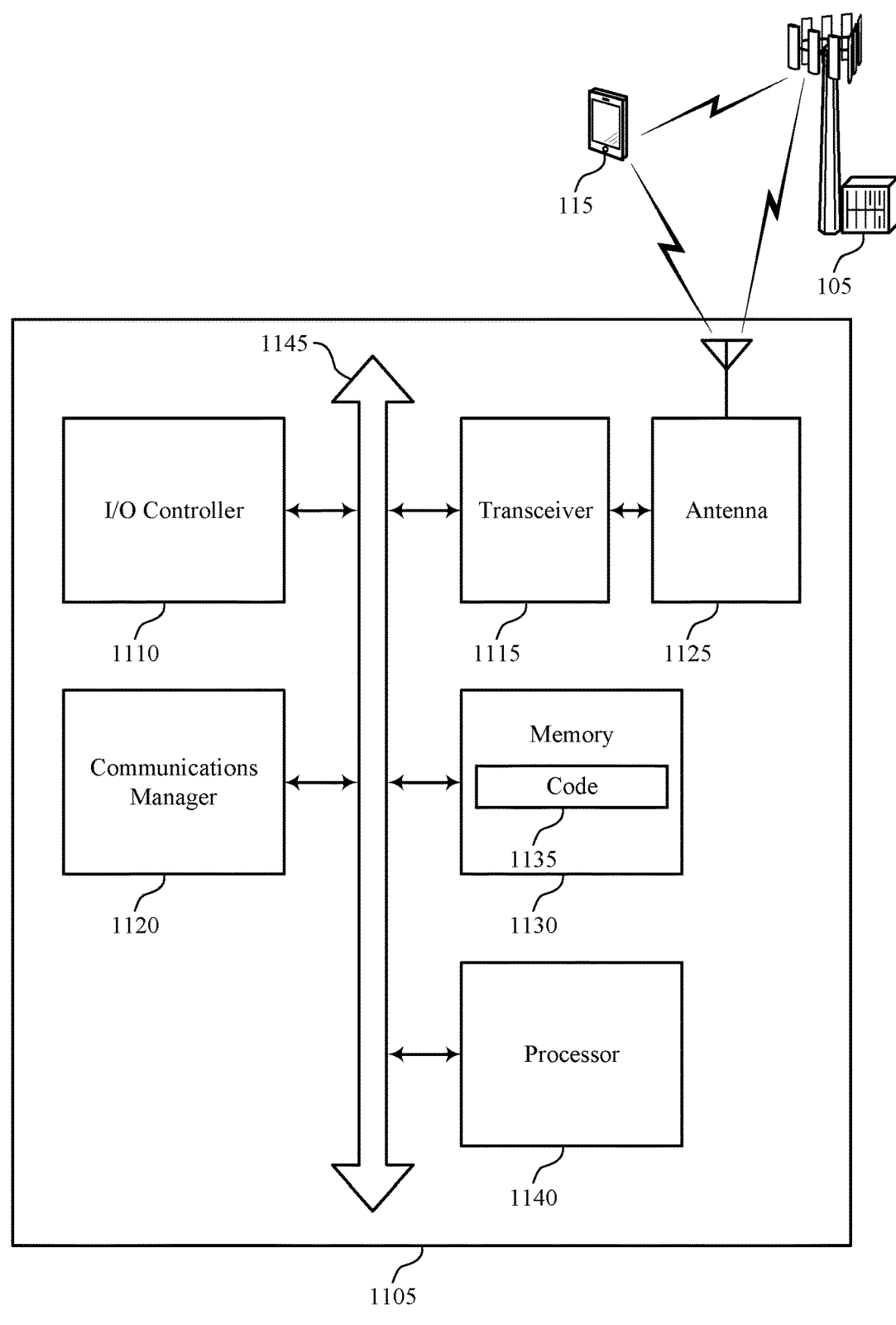
FIG. 11 illustrates a diagram of a system including a device that supports TBS determination in SBFD slots in accordance with one or more aspects of the present disclosure.

FIG. 11 illustrates a diagram of a system 1100 including a device 1105 that supports TBS determination in SBFD slots in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting TBS determination in SBFD slots). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The communications manager 1120 may be configured as or otherwise support a means for communicating the transmission during the time resource, where a TBS of the transmission is based on the at least one RB at least partially overlapping with the second subband or the guard band.

By including or configuring the communications manager 1120 in accordance with examples as described herein, the device 1105 may support techniques for more efficient utilization of communication resources and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of TBS determination in SBFD slots as described herein, or the processor 1140 and the memory 1130 may be otherwise configured to perform or support such operations.

Figure 12:
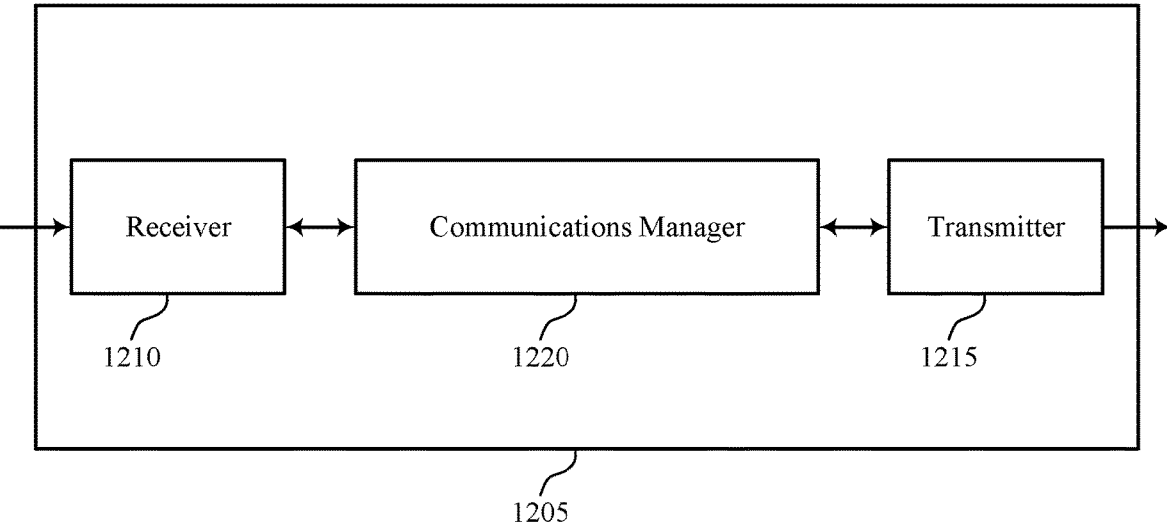
FIGS. 12 and 13 illustrate block diagrams of devices that support TBS determination in SBFD slots in accordance with one or more aspects of the present disclosure.

FIG. 12 illustrates a block diagram 1200 of a device 1205 that supports TBS determination in SBFD slots in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of TBS determination in SBFD slots as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. For example, the communications manager 1220 may be configured as or otherwise support a means for transmitting, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The communications manager 1220 may be configured as or otherwise support a means for communicating, with the UE, the transmission during the time resource, where a TBS of the transmission being based on the at least one RB at least partially overlapping with the second subband or the guard band.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for more efficient utilization of communication resources.

Figure 13:
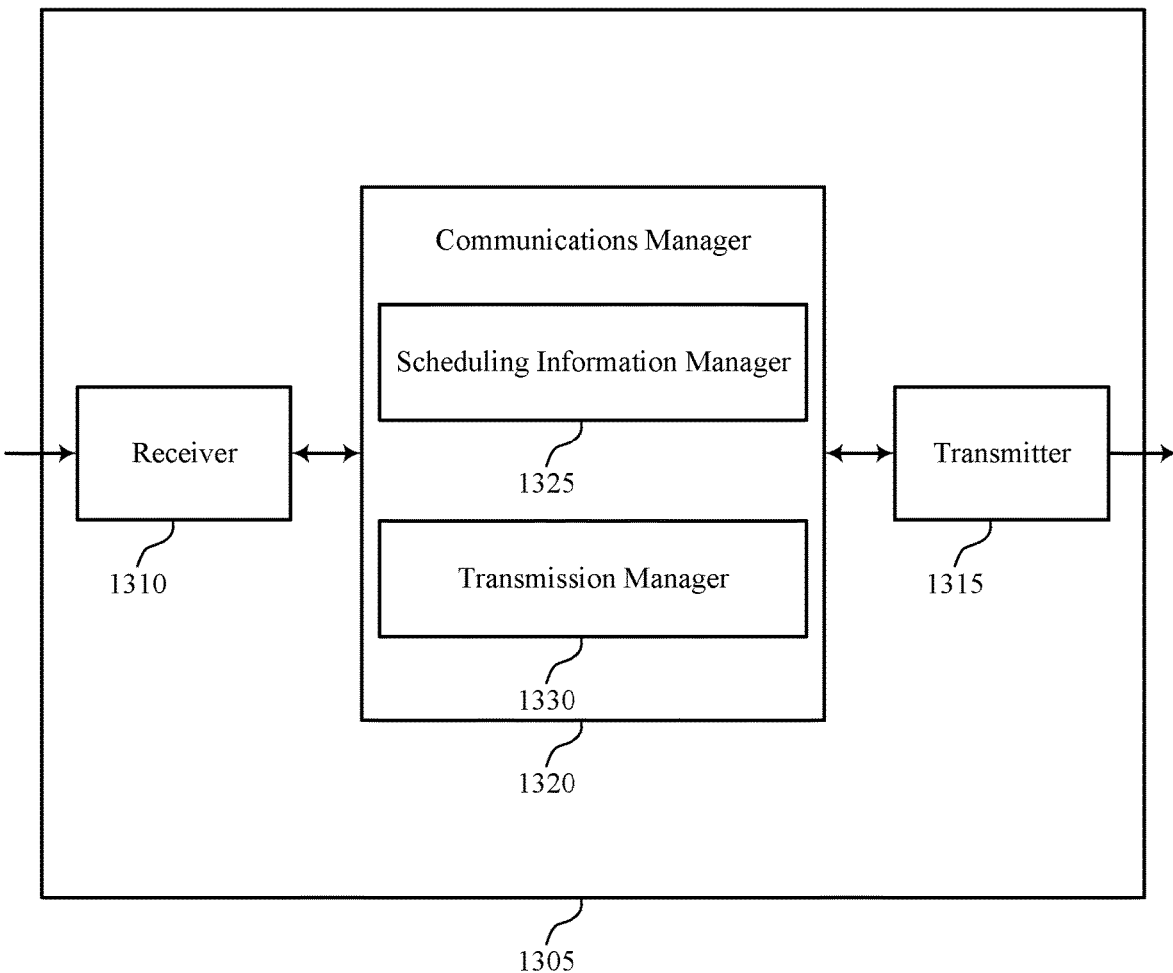
Figure 13:
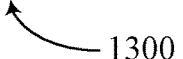

FIG. 13 illustrates a block diagram 1300 of a device 1305 that supports TBS determination in SBFD slots in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of TBS determination in SBFD slots as described herein. For example, the communications manager 1320 may include a Scheduling Information Manager 1325 a Transmission Manager 1330, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. The Scheduling Information Manager 1325 may be configured as or otherwise support a means for transmitting, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The Transmission Manager 1330 may be configured as or otherwise support a means for communicating, with the UE, the transmission during the time resource, where a TBS of the transmission is based on the at least one RB at least partially overlapping with the second subband or the guard band.

Figure 14:
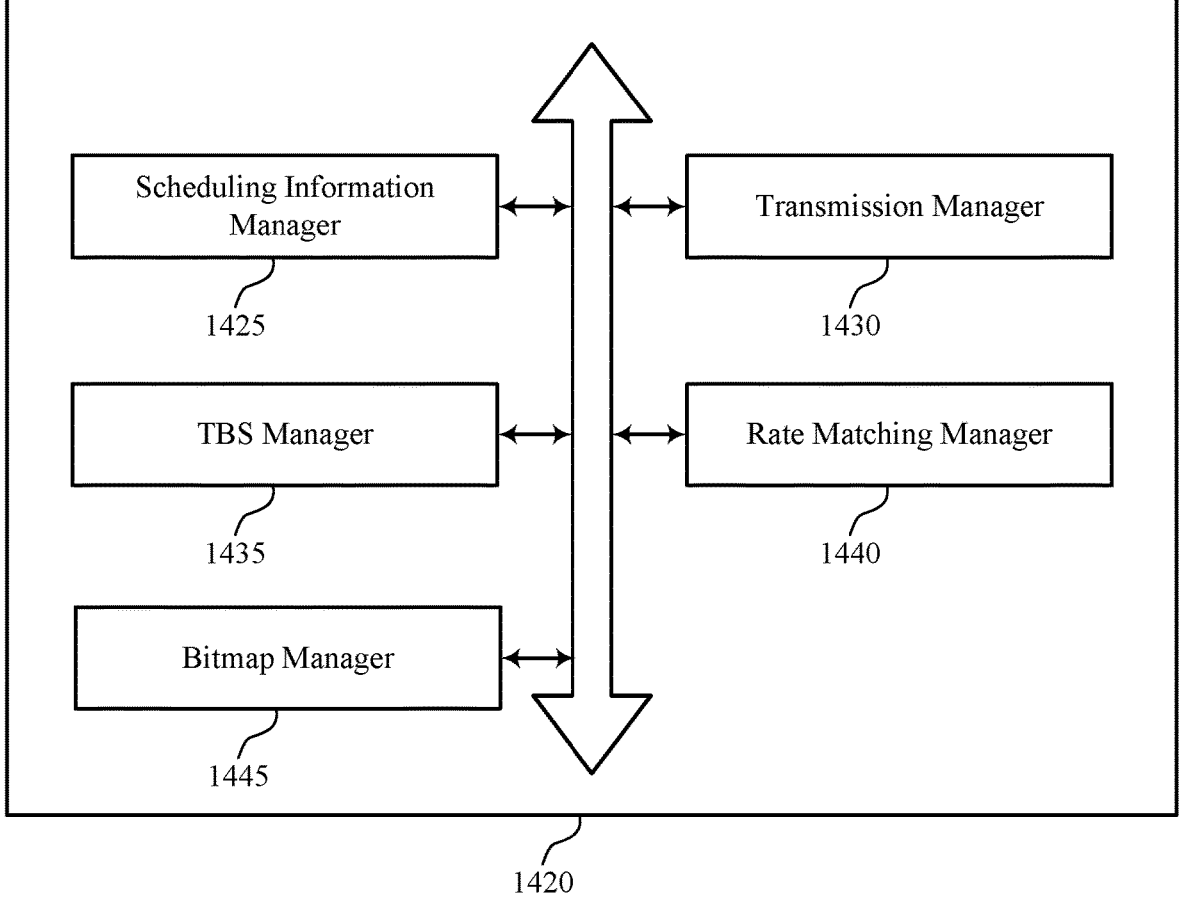
FIG. 14 illustrates a block diagram of a communications manager that supports TBS determination in SBFD slots in accordance with one or more aspects of the present disclosure.

FIG. 14 illustrates a block diagram 1400 of a communications manager 1420 that supports TBS determination in SBFD slots in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of TBS determination in SBFD slots as described herein. For example, the communications manager 1420 may include a Scheduling Information Manager 1425, a Transmission Manager 1430, a TBS manager 1435, a Rate Matching Manager 1440, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications at a network entity in accordance with examples as disclosed herein. The Scheduling Information Manager 1425 may be configured as or otherwise support a means for transmitting, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The Transmission Manager 1430 may be configured as or otherwise support a means for communicating, with the UE, the transmission during the time resource, where a TBS of the transmission is based on the at least one RB at least partially overlapping with the second subband or the guard band.

In some examples, to support communicating the transmission during the time resource, the TBS manager 1435 may be configured as or otherwise support a means for setting the TBS of the transmission based on a quantity of RBs of the set of RBs within the first subband or a third subband associated with the first communication direction.

In some examples, the TBS manager 1435 may be configured as or otherwise support a means for transmitting control signaling indicating to set the TBS of transmissions in the first communication direction that are scheduled with at least one RB that at least partially overlaps with the second subband or the guard band based on respective quantities of RBs scheduled for the transmissions that are associated with the first communication direction.

In some examples, the TBS manager 1435 may be configured as or otherwise support a means for transmitting control signaling indicating to set the TBS of transmissions in the first communication direction that are scheduled with a threshold quantity of RBs that at least partially overlaps with the second subband or the guard band based on respective quantities of RBs scheduled for the transmissions that are associated with the first communication direction, where a second quantity of RBs of the set of RBs that at least partially overlap with the second subband or the guard band satisfy the threshold quantity.

In some examples, to support communicating the transmission during the time resource, the TBS manager 1435 may be configured as or otherwise support a means for setting the TBS of the transmission based on a total quantity of RBs of the set of RBs. In some examples, to support communicating the transmission during the time resource, the Rate Matching Manager 1440 may be configured as or otherwise support a means for rate matching data of the transmission based on a second quantity of RBs of the set of RBs that at least partially overlap with the second subband or the guard band.

In some examples, the Rate Matching Manager 1440 may be configured as or otherwise support a means for transmitting control signaling indicating to rate match data of transmissions in the first communication direction that are scheduled with at least one RB that at least partially overlaps with the second subband or the guard band.

In some examples, to support transmitting the scheduling information, the Bitmap Manager 1445 may be configured as or otherwise support a means for transmitting a bitmap indicating the set of RBs, where each bit of the bitmap corresponds to a RB that at least partially overlaps with the second subband or the guard band indicates whether to rate match the transmission for that RB or to set the TBS for the transmission based on that RB at least partially overlapping with the second subband or the guard band.

In some examples, the Scheduling Information Manager 1425 may be configured as or otherwise support a means for transmitting control signaling indicating the time resource is associated with SBFD communications.

In some examples, the SBFD communications includes a third subband associated with the first communication direction. In some examples, the set of RBs includes a first subset of RBs in the first subband, a second subset of RBs in the second subband, and a third subset of RBs in the third subband. In some examples, communicating the transmission includes communicating the transmission via the first subset of RBs and the third subset of RBs.

In some examples, to support communicating the transmission, the Transmission Manager 1430 may be configured as or otherwise support a means for receiving via an uplink shared channel, where the first communication direction is an uplink direction and the second communication direction is a downlink direction.

In some examples, to support communicating the transmission, the Transmission Manager 1430 may be configured as or otherwise support a means for receiving via a downlink shared channel, where the first communication direction is a downlink direction and the second communication direction is an uplink direction.

Figure 15:
FIG. 15 illustrates a diagram of a system including a device that supports TBS determination in SBFD slots in accordance with one or more aspects of the present disclosure.

FIG. 15 illustrates a diagram of a system 1500 including a device 1505 that supports TBS determination in SBFD slots in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting TBS determination in SBFD slots). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a network entity in accordance with examples as disclosed herein. For example, the communications manager 1520 may be configured as or otherwise support a means for transmitting, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The communications manager 1520 may be configured as or otherwise support a means for communicating, with the UE, the transmission during the time resource, where a TBS of the transmission being based on the at least one RB at least partially overlapping with the second subband or the guard band.

By including or configuring the communications manager 1520 in accordance with examples as described herein, the device 1505 may support techniques for more efficient utilization of communication resources and improved utilization of processing capability.

In some examples, the communications manager 1520 may be configured to perform various operations (e.g., receiving, obtaining, monitoring, outputting, transmitting)

using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of TBS determination in SBFD slots as described herein, or the processor 1535 and the memory 1525 may be otherwise configured to perform or support such operations.

FIG. 16 illustrates a flowchart showing a method 1600 that supports TBS determination in SBFD slots in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The operations of 1605 may be performed in accordance with examples as disclosed herein. In some examples, aspects of the operations of 1605 may be performed by a Scheduling Information Manager 1025 as described with reference to FIG. 10.

At 1610, the method may include communicating the transmission during the time resource, where a TBS of the transmission is based on the at least one RB at least partially overlapping with the second subband or the guard band. The operations of 1610 may be performed in accordance with examples as disclosed herein. In some examples, aspects of the operations of 1610 may be performed by a Transmission Manager 1030 as described with reference to FIG. 10.

FIG. 17 illustrates a flowchart showing a method 1700 that supports TBS determination in SBFD slots in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The operations of 1705 may be performed in accordance with examples as disclosed herein. In some examples, aspects of the operations of 1705 may be performed by a Scheduling Information Manager 1025 as described with reference to FIG. 10.

At 1710, the method may include setting a TBS of the transmission based on a quantity of RBs of the set of RBs within the first subband or a third subband associated with the first communication direction. The operations of 1710 may be performed in accordance with examples as disclosed herein. In some examples, aspects of the operations of 1710 may be performed by a TBS manager 1035 as described with reference to FIG. 10.

At 1715, the method may include communicating the transmission during the time resource, where the TBS of the transmission is based on the at least one RB at least partially overlapping with the second subband or the guard band. The operations of 1715 may be performed in accordance with examples as disclosed herein. In some examples, aspects of the operations of 1715 may be performed by a Transmission Manager 1030 as described with reference to FIG. 10.

FIG. 18 illustrates a flowchart showing a method 1800 that supports TBS determination in SBFD slots in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The operations of 1805 may be performed in accordance with examples as disclosed herein. In some examples, aspects of the operations of 1805 may be performed by a Scheduling Information Manager 1425 as described with reference to FIG. 14.

At 1810, the method may include communicating, with the UE, the transmission during the time resource, where a TBS of the transmission is based on the at least one RB at least partially overlapping with the second subband or the guard band. The operations of 1810 may be performed in accordance with examples as disclosed herein. In some examples, aspects of the operations of 1810 may be performed by a Transmission Manager 1430 as described with reference to FIG. 14.

FIG. 19 illustrates a flowchart showing a method 1900 that supports TBS determination in SBFD slots in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a UE, scheduling information for a transmission in a first communication direction during a time resource, where the time resource is associated with SBFD communications including a first subband associated with the first communication direction and a second subband associated with a second communication direction, the scheduling information indicating a set of RBs for the transmission that includes at least one RB that at least partially overlaps with the second subband or a guard band between the first subband and the second subband. The operations of 1905 may be performed in accordance with examples as disclosed herein. In some examples, aspects of the operations of 1905 may be performed by a Scheduling Information Manager 1425 as described with reference to FIG. 14.

At 1910, the method may include setting a TBS of the transmission based on a quantity of RBs of the set of RBs within the first subband or a third subband associated with the first communication direction. The operations of 1910 may be performed in accordance with examples as disclosed herein. In some examples, aspects of the operations of 1910 may be performed by a TBS manager 1435 as described with reference to FIG. 14.

At 1915, the method may include communicating, with the UE, the transmission during the time resource, where the TBS of the transmission is based on the at least one RB at least partially overlapping with the second subband or the guard band. The operations of 1915 may be performed in accordance with examples as disclosed herein. In some examples, aspects of the operations of 1915 may be performed by a Transmission Manager 1430 as described with reference to FIG. 14.

The following provides an overview of aspects of the present disclosure:

Aspect 1: A method for wireless communications at a UE, comprising: receiving scheduling information for a transmission in a first communication direction during a time resource, wherein the time resource is associated with SBFD communications comprising a first subband associated with the first communication direction and a second subband associated with a second communication direction, the scheduling information indicating a set of RBs for the transmission that includes at least one RB that at least partially overlaps with the second subband or a guard band between the first subband and the second subband; and communicating the transmission during the time resource, wherein a TBS of the transmission is based at least in part on the at least one RB at least partially overlapping with the second subband or the guard band.

Aspect 2: The method of aspect 1, wherein communicating the transmission during the time resource comprises: setting the TBS of the transmission based at least in part on a quantity of RBs of the set of RBs within the first subband or a third subband associated with the first communication direction.

Aspect 3: The method of aspect 2, further comprising: receiving control signaling indicating to set the TBS of transmissions in the first communication direction that are scheduled with at least one RB that at least partially overlaps with the second subband or the guard band based at least in part on respective quantities of RBs scheduled for the transmissions that are associated with the first communication direction.

Aspect 4: The method of any of aspects 2 through 3, further comprising: receiving control signaling indicating to set the TBS of transmissions in the first communication direction that are scheduled with a threshold quantity of RBs that at least partially overlaps with the second subband or the guard band based at least in part on respective quantities of RBs scheduled for the transmissions that are associated with the first communication direction, wherein a second quantity of RBs of the set of RBs that at least partially overlap with the second subband or the guard band satisfy the threshold quantity.

Aspect 5: The method of any of aspects 1 through 4, wherein communicating the transmission during the time resource comprises: setting the TBS of the transmission based at least in part on a total quantity of RBs of the set of RBs; and rate matching data of the transmission based at least in part on a second quantity of RBs of the set of RBs that at least partially overlap with the second subband or the guard band.

Aspect 6: The method of aspect 5, further comprising: receiving control signaling indicating to rate match data of transmissions in the first communication direction that are scheduled with at least one RB that at least partially overlaps with the second subband or the guard band.

Aspect 7: The method of any of aspects 1 through 6, wherein receiving the scheduling information comprises: receiving a bitmap indicating the set of RBs, wherein each bit of the bitmap corresponds to a RB that at least partially overlaps with the second subband or the guard band indicates whether to rate match the transmission for that RB or to set the TBS for the transmission based at least in part on that RB at least partially overlapping with the second subband or the guard band.

Aspect 8: The method of any of aspects 1 through 7, further comprising: receiving control signaling indicating the time resource is associated with SBFD communications.

Aspect 9: The method of any of aspects 1 through 8, wherein the SBFD communications comprises a third subband associated with the first communication direction; the set of RBs comprises a first subset of RBs in the first subband, a second subset of RBs in the second subband, and a third subset of RBs in the third subband; and communicating the transmission comprises communicating the transmission via the first subset of RBs and the third subset of RBs.

Aspect 10: The method of any of aspects 1 through 9, wherein communicating the transmission comprises: transmitting via an uplink shared channel, wherein the first communication direction is an uplink direction and the second communication direction is a downlink direction.

Aspect 11: The method of any of aspects 1 through 10, wherein communicating the transmission comprises: receiving via a downlink shared channel, wherein the first communication direction is a downlink direction and the second communication direction is an uplink direction.

Aspect 12: A method for wireless communications at a network entity, comprising: transmitting, to a UE, scheduling information for a transmission in a first communication direction during a time resource, wherein the time resource is associated with SBFD communications comprising a first subband associated with the first communication direction and a second subband associated with a second communication direction, the scheduling information indicating a set of RBs for the transmission that includes at least one RB that at least partially overlaps with the second subband or a guard band between the first subband and the second subband; and communicating, with the UE, the transmission during the time resource, wherein a TBS of the transmission is based at least in part on the at least one RB at least partially overlapping with the second subband or the guard band.

Aspect 13: The method of aspect 12, wherein communicating the transmission during the time resource comprises: setting the TBS of the transmission based at least in part on a quantity of RBs of the set of RBs within the first subband or a third subband associated with the first communication direction.

Aspect 14: The method of aspect 13, further comprising: transmitting control signaling indicating to set the TBS of transmissions in the first communication direction that are scheduled with at least one RB that at least partially overlaps with the second subband or the guard band based at least in part on respective quantities of RBs scheduled for the transmissions that are associated with the first communication direction.

Aspect 15: The method of any of aspects 13 through 14, further comprising: transmitting control signaling indicating to set the TBS of transmissions in the first communication direction that are scheduled with a threshold quantity of RBs that at least partially overlaps with the second subband or the guard band based at least in part on respective quantities of RBs scheduled for the transmissions that are associated with the first communication direction, wherein a second quantity of RBs of the set of RBs that at least partially overlap with the second subband or the guard band satisfy the threshold quantity.

Aspect 16: The method of any of aspects 12 through 15, wherein communicating the transmission during the time resource comprises: setting the TBS of the transmission based at least in part on a total quantity of RBs of the set of RBs; and rate matching data of the transmission based at least in part on a second quantity of RBs of the set of RBs that at least partially overlap with the second subband or the guard band.

Aspect 17: The method of aspect 16, further comprising: transmitting control signaling indicating to rate match data of transmissions in the first communication direction that are scheduled with at least one RB that at least partially overlaps with the second subband or the guard band.

Aspect 18: The method of any of aspects 12 through 17, wherein transmitting the scheduling information comprises: transmitting a bitmap indicating the set of RBs, wherein each bit of the bitmap corresponds to a RB that at least partially overlaps with the second subband or the guard band indicates whether to rate match the transmission for that RB or to set the TBS for the transmission based at least in part on that RB at least partially overlapping with the second subband or the guard band.

Aspect 19: The method of any of aspects 12 through 18, further comprising: transmitting control signaling indicating the time resource is associated with SBFD communications.

Aspect 20: The method of any of aspects 12 through 19, wherein the SBFD communications comprises a third subband associated with the first communication direction; the set of RBs comprises a first subset of RBs in the first subband, a second subset of RBs in the second subband, and a third subset of RBs in the third subband; and communicating the transmission comprises communicating the transmission via the first subset of RBs and the third subset of RBs.

Aspect 21: The method of any of aspects 12 through 20, wherein communicating the transmission comprises: receiving via an uplink shared channel, wherein the first communication direction is an uplink direction and the second communication direction is a downlink direction.

Aspect 22: The method of any of aspects 12 through 21, wherein communicating the transmission comprises: receiving via a downlink shared channel, wherein the first communication direction is a downlink direction and the second communication direction is an uplink direction.

Aspect 23: An apparatus for wireless communications at a UE, comprising a processor; memory coupled with the processor; and instructions stored in the memory and executable by the processor to cause the apparatus to perform a method of any of aspects 1 through 11.

Aspect 24: An apparatus for wireless communications at a UE, comprising at least one means for performing a method of any of aspects 1 through 11.

Aspect 25: A non-transitory computer-readable medium storing code for wireless communications at a UE, the code comprising instructions executable by a processor to perform a method of any of aspects 1 through 11.

Aspect 26: An apparatus for wireless communications at a network entity, comprising a processor; memory coupled with the processor; and instructions stored in the memory and executable by the processor to cause the apparatus to perform a method of any of aspects 12 through 22.

Aspect 27: An apparatus for wireless communications at a network entity, comprising at least one means for performing a method of any of aspects 12 through 22.

Aspect 28: A non-transitory computer-readable medium storing code for wireless communications at a network entity, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

As used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
      receive scheduling information for an uplink transmission during a time resource, wherein the time resource is associated with subband full duplex communications comprising an uplink subband and a downlink subband, the scheduling information indicating a set of resource blocks for the uplink transmission that includes at least one resource block that at least partially overlaps with the downlink subband or a guard band between the uplink subband and the downlink subband;
      set a transport block size of the uplink transmission based at least in part on a total quantity of resource blocks of the set of resource blocks within the uplink subband and a second quantity of resources blocks in the at least one resource block that at least partially overlaps with the downlink subband or the guard band; and
      transmit, via an uplink shared channel, the uplink transmission during the time resource, wherein the transport block size of the uplink transmission is based at least in part on the at least one resource block at least partially overlapping with the downlink subband or the guard band.

2. The apparatus of claim 1, wherein the instructions are further executable by the one or more processors to cause the apparatus to:
   receive control signaling indicating to set the transport block size of uplink transmissions that are scheduled with the at least one resource block that at least partially overlaps with the downlink subband or the guard band based at least in part on respective quantities of resource blocks scheduled for the uplink transmissions.

3. The apparatus of claim 1, wherein the instructions are further executable by the one or more processors to cause the apparatus to:
   receive control signaling indicating to set the transport block size of uplink transmissions that are scheduled with a threshold quantity of resource blocks that at least partially overlaps with the downlink subband or the guard band based at least in part on respective quantities of resource blocks scheduled for the uplink transmissions, wherein the second quantity of resource blocks of the at least one resource block that at least partially overlaps with the downlink subband or the guard band satisfy the threshold quantity.

4. The apparatus of claim 1, wherein the instructions to transmit the uplink transmission during the time resource are executable by the one or more processors to cause the apparatus to:
   rate match data of the uplink transmission based at least in part on the second quantity of resource blocks of the at least one resource block that at least partially overlaps with the downlink subband or the guard band.

5. The apparatus of claim 4, wherein the instructions are further executable by the one or more processors to cause the apparatus to:
   receive control signaling indicating to rate match data of uplink transmissions that are scheduled with the at least one resource block that at least partially overlaps with the downlink subband or the guard band.

6. The apparatus of claim 1, wherein the instructions to receive the scheduling information are executable by the one or more processors to cause the apparatus to:
   receive a bitmap indicating the set of resource blocks, wherein each bit of the bitmap corresponds to a resource block that at least partially overlaps with the downlink subband or the guard band and indicates whether to rate match the uplink transmission for that resource block or to set the transport block size for the uplink transmission based at least in part on that resource block at least partially overlapping with the downlink subband or the guard band.

7. The apparatus of claim 1, wherein the instructions are further executable by the one or more processors to cause the apparatus to:
   receive control signaling indicating the time resource is associated with subband full duplex communications.

8. The apparatus of claim 1, wherein:
   the subband full duplex communications comprises the uplink subband;

the set of resource blocks comprises a first subset of resource blocks in the uplink subband, a second subset of resource blocks in the downlink subband, and a third subset of resource blocks; and the instructions to transmit the uplink transmission are executable by the one or more processors to cause the apparatus to transmit the uplink transmission via the first subset of resource blocks and the third subset of resource blocks.

9. An apparatus for wireless communications at a network entity, comprising:

one or more processors;

one or more memories coupled with the one or more processors; and instructions stored in the one or more memories and executable by the one or more processors to cause the apparatus to:

transmit, to a user equipment (UE), scheduling information for an uplink transmission during a time resource, wherein the time resource is associated with subband full duplex communications comprising an uplink subband and a downlink subband, the scheduling information indicating a set of resource blocks for the uplink transmission that includes at least one resource block that at least partially overlaps with the downlink subband or a guard band between the uplink subband and the downlink subband; and receive, via an uplink shared channel from the UE, the uplink transmission during the time resource, wherein a transport block size of the uplink transmission is based at least in part on the at least one resource block at least partially overlapping with the downlink subband or the guard band, and wherein the transport block size is set based at least in part on a total quantity of resource blocks of the set of resource blocks within the uplink subband and a second quantity of resources blocks in the at least one resource block that at least partially overlaps with the downlink subband or the guard band.

10. The apparatus of claim 9, wherein the instructions are further executable by the one or more processors to cause the apparatus to:

transmit control signaling indicating to set the transport block size of uplink transmissions that are scheduled with the at least one resource block that at least partially overlaps with the downlink subband or the guard band based at least in part on respective quantities of resource blocks scheduled for the uplink transmissions.

11. The apparatus of claim 9, wherein the instructions are further executable by the one or more processors to cause the apparatus to:

transmit control signaling indicating to set the transport block size of uplink transmissions that are scheduled with a threshold quantity of resource blocks that at least partially overlaps with the downlink subband or the guard band based at least in part on respective quantities of resource blocks scheduled for the uplink transmissions, wherein the second quantity of resource blocks of the at least one resource block set of resource blocks that at least partially overlaps with the downlink subband or the guard band satisfy the threshold quantity.

12. The apparatus of claim 9 wherein the instructions are further executable by the one or more processors to cause the apparatus to:

transmit control signaling indicating to rate match data of uplink transmissions that are scheduled with the at least one resource block that at least partially overlaps with the downlink subband or the guard band.

13. The apparatus of claim 9, wherein the instructions to transmit the scheduling information are executable by the one or more processors to cause the apparatus to:

transmit a bitmap indicating the set of resource blocks, wherein each bit of the bitmap corresponds to a resource block that at least partially overlaps with the downlink subband or the guard band and indicates whether to rate match the uplink transmission for that resource block or to set the transport block size for the uplink transmission based at least in part on that resource block at least partially overlapping with the downlink subband or the guard band.

14. The apparatus of claim 9, wherein the instructions are further executable by the one or more processors to cause the apparatus to:

transmit control signaling indicating the time resource is associated with subband full duplex communications.

15. The apparatus of claim 9, wherein:

the subband full duplex communications comprises the uplink subband;

the set of resource blocks comprises a first subset of resource blocks in the uplink subband, a second subset of resource blocks in the downlink subband, and a third subset of resource blocks; and the instructions to receive the uplink transmission are executable by the one or more processors to cause the apparatus to receive the uplink transmission via the first subset of resource blocks and the third subset of resource blocks.

16. A method for wireless communications at a user equipment (UE), comprising:

receiving scheduling information for an uplink transmission during a time resource, wherein the time resource is associated with subband full duplex communications comprising an uplink subband and a downlink subband, the scheduling information indicating a set of resource blocks for the uplink transmission that includes at least one resource block that at least partially overlaps with the downlink subband or a guard band between the uplink subband and the downlink subband;

setting a transport block size of the uplink transmission based at least in part on a total quantity of resource blocks of the set of resource blocks within the uplink subband and a second quantity of resources blocks in the at least one resource block that at least partially overlaps with the downlink subband or the guard band; and transmitting, via an uplink shared channel, the uplink transmission during the time resource, wherein the transport block size of the uplink transmission is based at least in part on the at least one resource block at least partially overlapping with the downlink subband or the guard band.

17. The method of claim 16, further comprising:

receiving control signaling indicating to set the transport block size of uplink transmissions that are scheduled with the at least one resource block that at least partially overlaps with the downlink subband or the guard band based at least in part on respective quantities of resource blocks scheduled for the uplink transmissions.

18. The method of claim 16, further comprising:

receiving control signaling indicating to set the transport block size of uplink transmissions that are scheduled with a threshold quantity of resource blocks that at least partially overlaps with the downlink subband or the guard band based at least in part on respective quantities of resource blocks scheduled for the uplink transmissions, wherein the second quantity of resource blocks of the at least one resource block that at least partially overlaps with the downlink subband or the guard band satisfy the threshold quantity.

19. The method of claim 16, wherein transmitting the uplink transmission during the time resource comprises:
rate matching data of the uplink transmission based at least in part on the second quantity of resource blocks of the at least one resource block that at least partially overlaps with the downlink subband or the guard band.

20. The method of claim 19, further comprising:
receiving control signaling indicating to rate match data of uplink transmissions that are scheduled with the at least one resource block that at least partially overlaps with the downlink subband or the guard band.

21. The method of claim 16, wherein receiving the scheduling information comprises:
receiving a bitmap indicating the set of resource blocks, wherein each bit of the bitmap corresponds to a resource block that at least partially overlaps with the downlink subband or the guard band and indicates whether to rate match the uplink transmission for that resource block or to set the transport block size for the uplink transmission based at least in part on that resource block at least partially overlapping with the downlink subband or the guard band.

22. A method for wireless communications at a network entity, comprising:
transmitting, to a user equipment (UE), scheduling information for an uplink transmission during a time resource, wherein the time resource is associated with subband full duplex communications comprising an uplink subband and a downlink subband, the scheduling information indicating a set of resource blocks for the uplink transmission that includes at least one resource block that at least partially overlaps with the downlink subband or a guard band between the uplink subband and the downlink subband; and
receiving, via an uplink shared channel from the UE, the uplink transmission during the time resource, wherein a transport block size of the uplink transmission is based at least in part on the at least one resource block at least partially overlapping with the downlink subband or the guard band, and wherein the transport block size is set based at least in part on a total quantity of resource blocks of the set of resource blocks within the uplink subband and a second quantity of resources blocks in the at least one resource block that at least partially overlaps with the downlink subband or the guard band.

\* \* \* \* \*